(12) United States Patent
Yamamoto et al.

(10) Patent No.: US 6,714,550 B1
(45) Date of Patent: Mar. 30, 2004

(54) COMMUNICATION SYSTEM, COMMUNICATION APPARATUS WHICH CAN BE CONNECTED TO COMMUNICATION SYSTEM, CONTROL METHOD FOR CONTROL SYSTEM, AND CONTROL METHOD FOR COMMUNICATION APPARATUS WHICH CAN BE CONNECTED TO COMMUNICATION SYSTEM

(75) Inventors: Noboru Yamamoto, Yokohama (JP); Toru Nakata, Kawasaki (JP); Kazuhiko Hojo, Kawasaki (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 09/052,447

(22) Filed: Mar. 31, 1998

(30) Foreign Application Priority Data

Apr. 1, 1997 (JP) .............................. 9-082735
Jun. 26, 1997 (JP) .............................. 9-170278
Mar. 18, 1998 (JP) ............................. 10-068587

(51) Int. Cl.[7] .............................. H04L 12/56
(52) U.S. Cl. ..................... 370/400; 370/420
(58) Field of Search ................. 370/400, 404, 370/405, 406, 408, 409, 410, 412, 413, 419, 420, 421, 424, 364, 360; 359/124

(56) References Cited

U.S. PATENT DOCUMENTS 5,742,585 A * 4/1998 Yamamoto et al. ......... 370/223
5,828,669 A * 10/1998 Yamamoto .................. 370/412
5,848,059 A * 12/1998 Yamamoto .................. 370/258
5,930,014 A * 7/1999 Yamamoto .................. 359/118
6,005,862 A * 12/1999 Yamamoto .................. 370/392
6,038,236 A * 3/2000 Houjou et al. .............. 370/465
6,044,076 A * 3/2000 Yamamoto .................. 370/392
6,078,415 A * 6/2000 Yamamoto .................. 359/128

FOREIGN PATENT DOCUMENTS

| JP | 04-176232 | 6/1992 |
| JP | 05-260060 | 10/1993 |
| JP | 08-172394 | 2/1996 |
| JP | 08-237306 | 12/1996 |

* cited by examiner

Primary Examiner—Wellington Chin
Assistant Examiner—Brenda Pham
(74) Attorney, Agent, or Firm—Morgan & Finnegan

(57) ABSTRACT

Signals are evenly distributed and transmitted using a plurality of channels. Multicast and broadcast communications are efficiently made. Signals from each sub transmission paths are distributed onto a plurality of channels to send them via these channels. Furthermore, signals are inserted into the channels by finding empty packets from the channels, thus allowing input of signals to the channels that transfer various kinds of signals. Upon multicast or broadcast communications, an input signal is copied in correspondence with a plurality of channels.

17 Claims, 20 Drawing Sheets

310 320 330

DATA

SUB TRANSMISSION
PATH IDENTIFICATION
INFORMATION

NODE DEVICE
IDENTIFICATION
INFORMATION

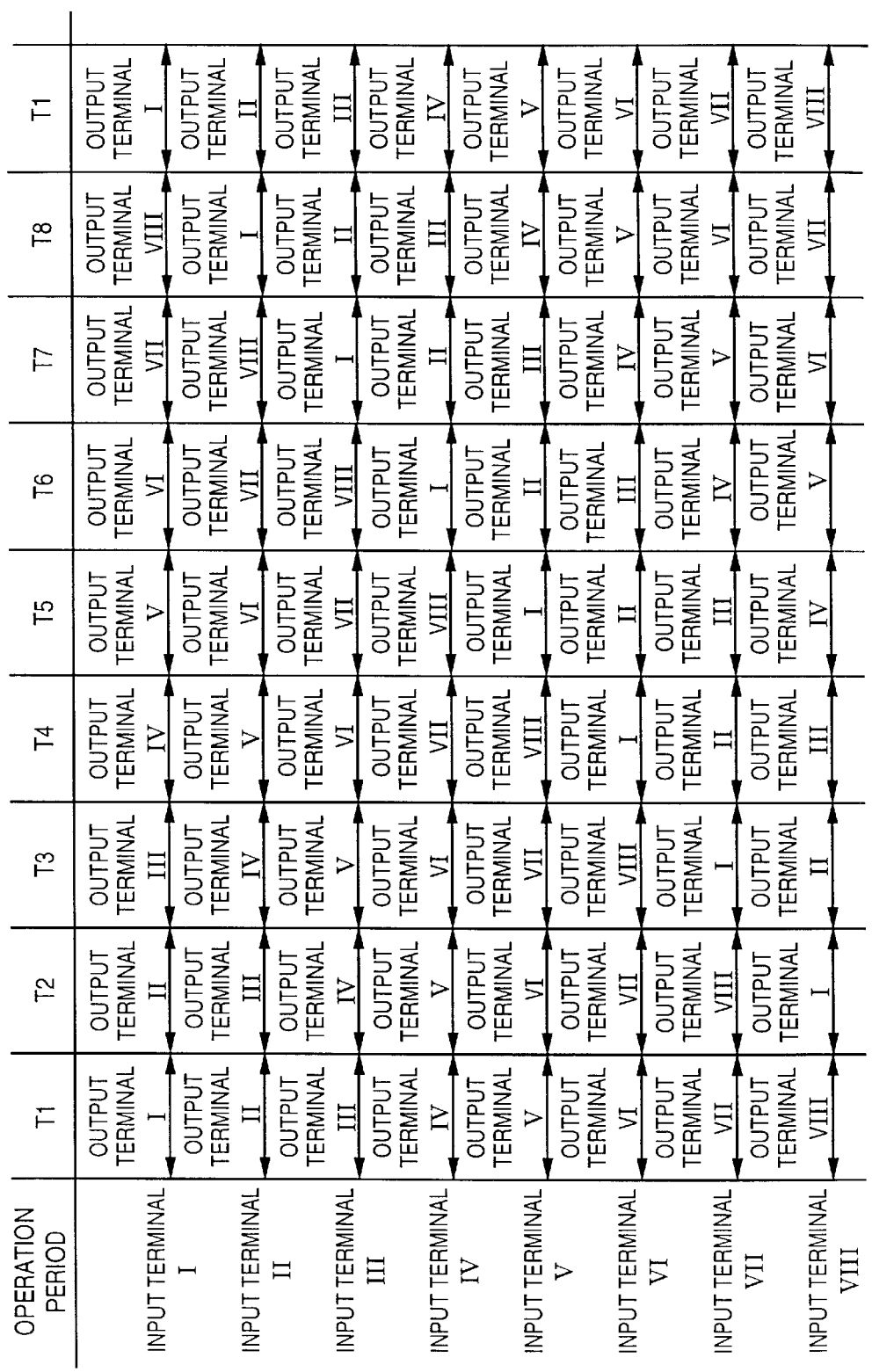

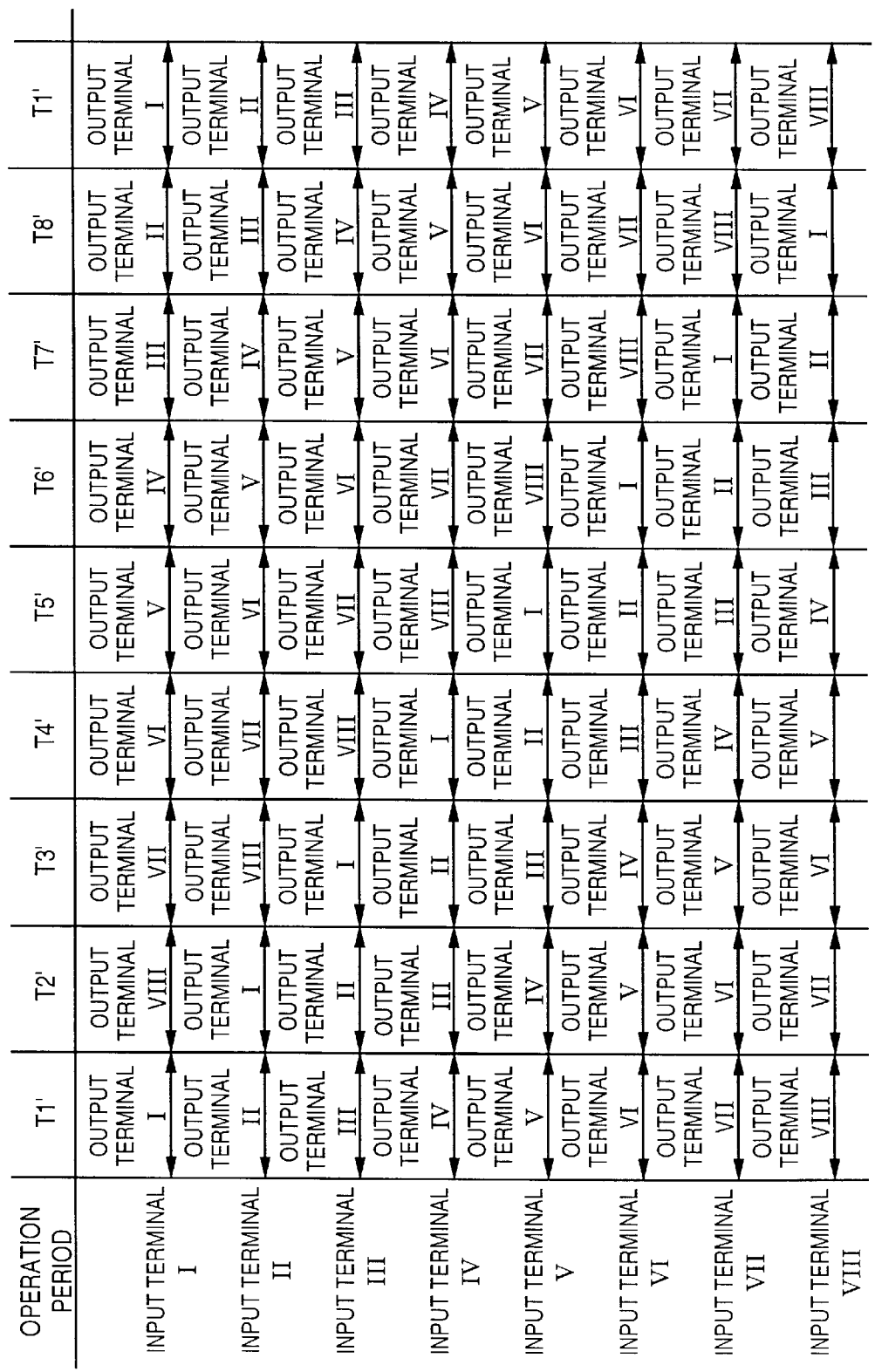

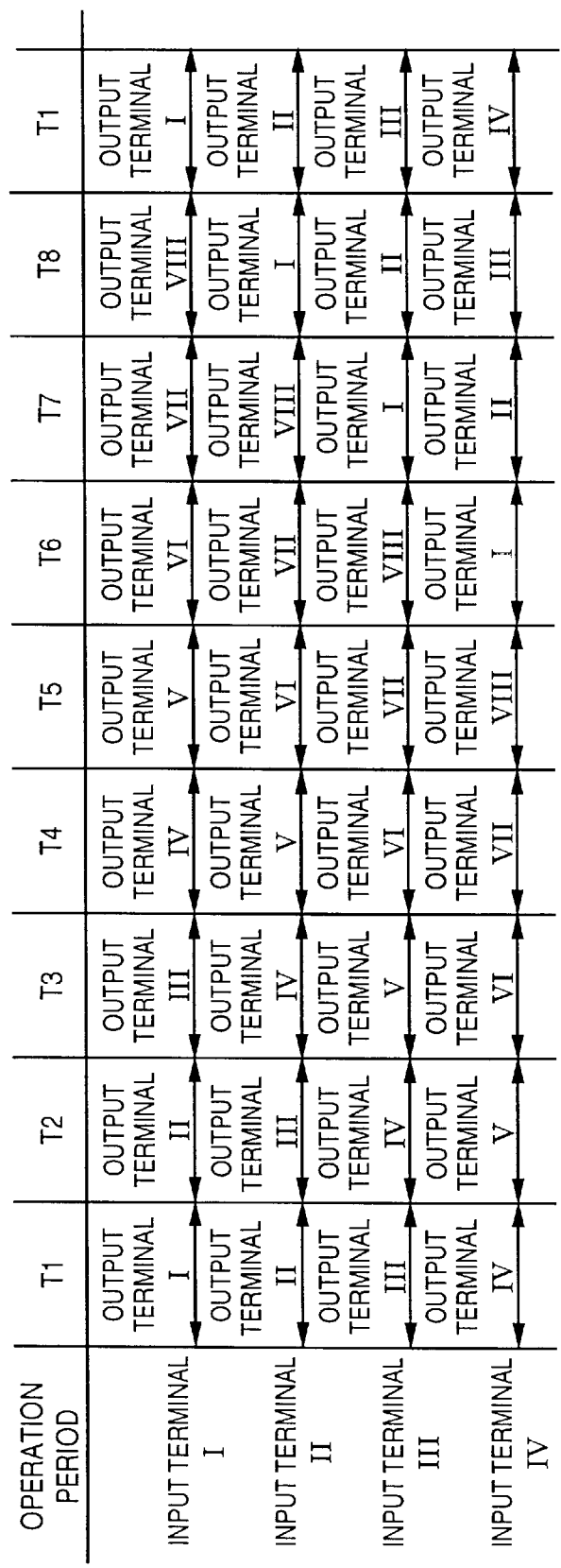

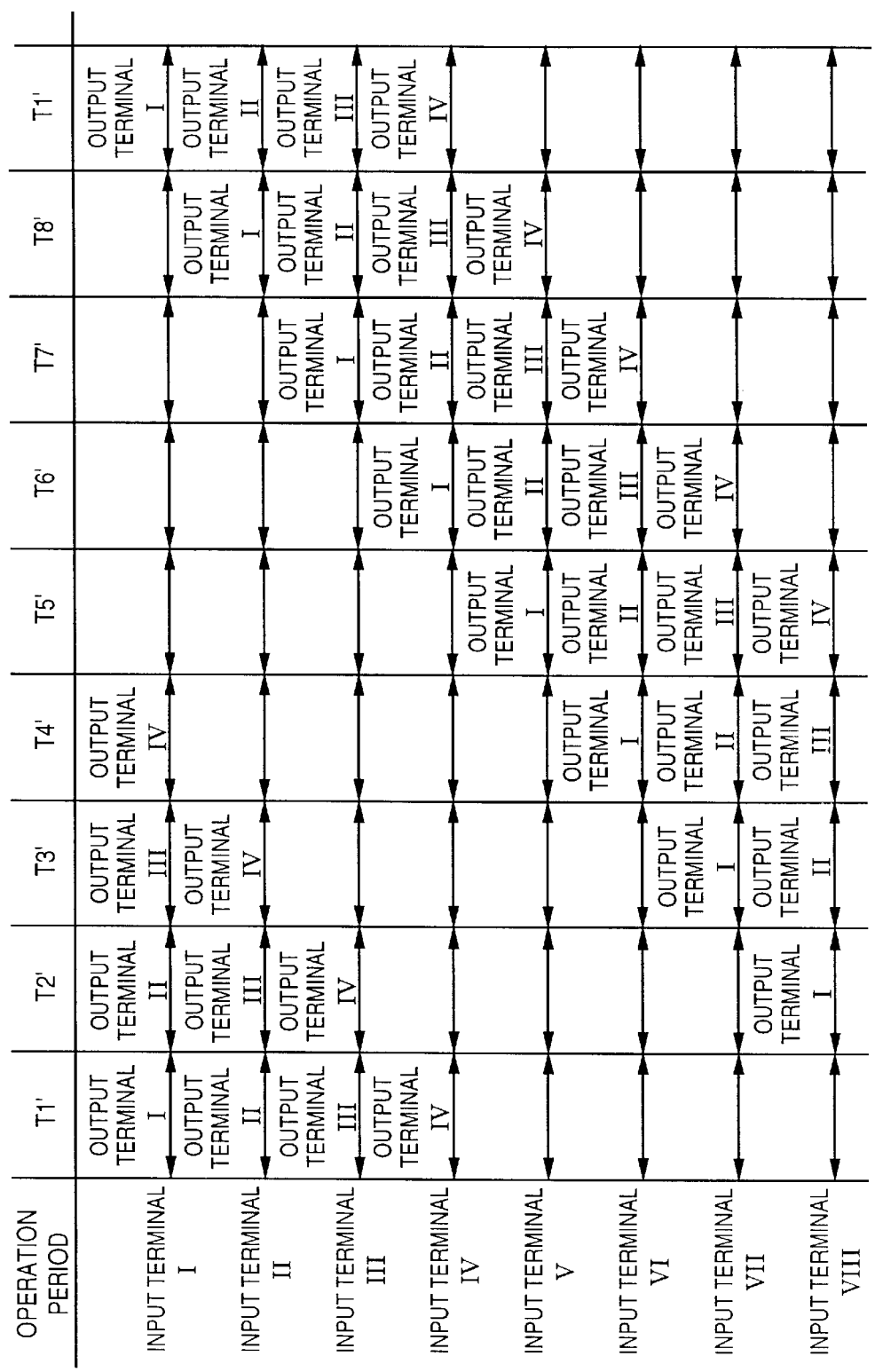

COMMUNICATION SYSTEM, COMMUNICATION APPARATUS WHICH CAN BE CONNECTED TO COMMUNICATION SYSTEM, CONTROL METHOD FOR CONTROL SYSTEM, AND CONTROL METHOD FOR COMMUNICATION APPARATUS WHICH CAN BE CONNECTED TO COMMUNICATION SYSTEM

BACKGROUND OF THE INVENTION

1. Field of the Invention

The present invention relates to a communication system, a communication apparatus which can be connected to a communication system, a control method for a communication system, and a control method for a communication apparatus which can be connected to a communication system.

2. Description of the Related Art

In recent years, in order to attain higher-speed terminal devices and a higher-speed network that connects terminals, a network system which uses a network built by a multi-channel transmission path using a plurality of channels has been examined.

As shown in FIG. 9, a node device and network system of this type comprise a node device 911 for connecting a plurality of terminal devices 971 and 978, and a multi-channel transmission path 900 which connects a plurality of such node devices, and uses a plurality of channels. In the network system shown in FIG. 9, a packet which is transmitted from the terminal device 971 and input to an input I/F unit 941 is switched by a switch fabric 921 so as to be transmitted onto the multi-channel transmission path from one of a plurality of transmitters 951 to 958, and is output to a predetermined transmitter. Then, the packet is output onto the multi-channel transmission path. After that, the packet is relayed by node devices inserted before the node device connected with a destination terminal device, and is finally received by the receiver of the target node device. Furthermore, the destination of the packet is controlled by a switch fabric, so that the packet is output from an output I/F unit connected with the destination receiving terminal, and the packet is then received by the terminal device. The switch fabric 921 of the node device serves to route a packet to a desired terminal device of a desired node device by controlling switching, i.e., determining one of a plurality of transmitters or output I/F units to which the input packet is to be output.

The switch fabric used in the prior art normally comprises a cross-bar type switch having N inputs and N outputs. The number N of inputs is the sum of the numbers of receivers and input I/F units, and similarly, the number N of outputs is the sum of the numbers of transmitters and output I/F units.

A packet switched by the switch fabric is normally made up of address information indicating the destination terminal of that packet, and data information carried by the packet. The switch fabric has a function of temporarily storing the destination address of the input packet, compares the stored address with those of all the terminal devices connected to the network system, which are written in a memory table, and switches to output the packet to a desired output terminal. In this case, since occurrence of output congestion pertaining to inputs must be detected to execute arbitration control so that a packet input to an input terminal is output from a predetermined output terminal, the hardware scale of this controller increases.

Japanese Patent Laid-Open Nos. 5-260060 and 4-176232 disclose other network configurations which transmit signals using a plurality of channels.

Japanese Patent Laid-Open No. 5-260060 discloses a technique that finds an empty one of a plurality of rings by search, and transmits in turn signals segmented at equal intervals onto the empty ring.

Japanese Patent Laid-Open No. 4-176232 discloses a technique for transmitting packets by distributing them in a predetermined order. FIG. 9 of Japanese Patent Laid-Open No. 4-176232 in question discloses a technique that outputs signals sent via a plurality of channels onto a plurality of sub transmission paths using an ATM switch. The ATM switch outputs signals sent via m channels to n reception buffers as m systems of signals, and the reception buffers read out the m systems of input signals in a predetermined order.

Furthermore, Japanese Patent Laid-Open Nos. 8-172394 and 8-237306 disclose a network system that changes channels of a main transmission path.

SUMMARY OF THE INVENTION

It is an object of the present invention to efficiently output signals sent via a plurality of channels onto a plurality of sub transmission paths.

It is another object of the present invention to output signals sent on a plurality of channels toward sub transmission paths by selecting necessary signals.

It is still another object of the present invention to efficiently input signals sent via a plurality of sub transmission paths to a plurality of channels.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 5A and 5B are tables showing connection examples of the connection change unit in the first embodiment of the present invention;

FIGS. 8A and 8B are tables showing connection examples of a connection change unit in the third embodiment of the present invention;

DESCRIPTION OF THE PREFERRED EMBODIMENTS

First Embodiment

Figure 1:
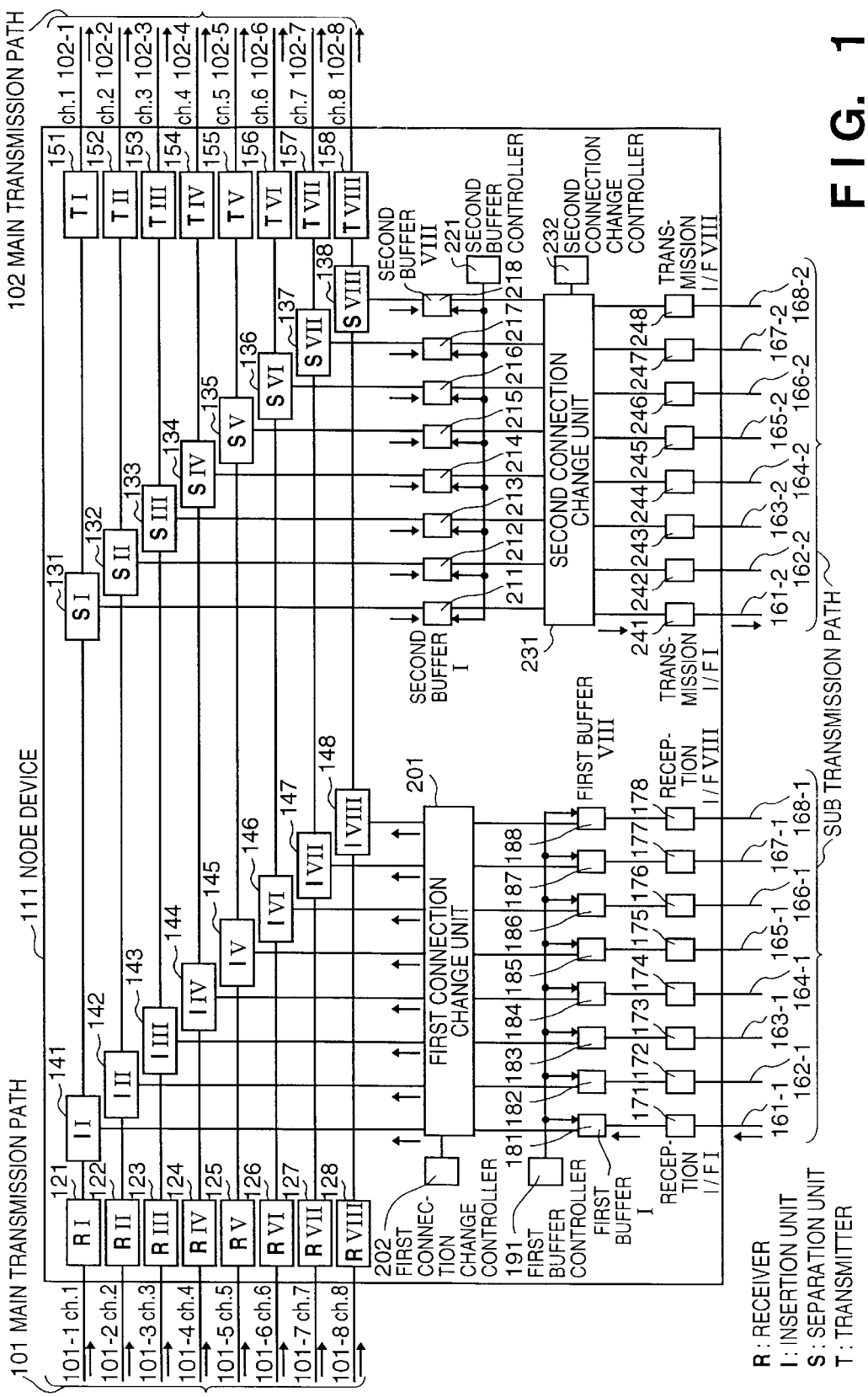
FIG. 1 is a block diagram showing the arrangement of a node device according to the first embodiment of the present invention.

FIG. 1 shows a node device according to the first embodiment of the present invention, and exemplifies a node device which connects eight sub transmission paths to a main transmission path in a network transmission system that uses a main transmission path having eight channels.

Figure 2:
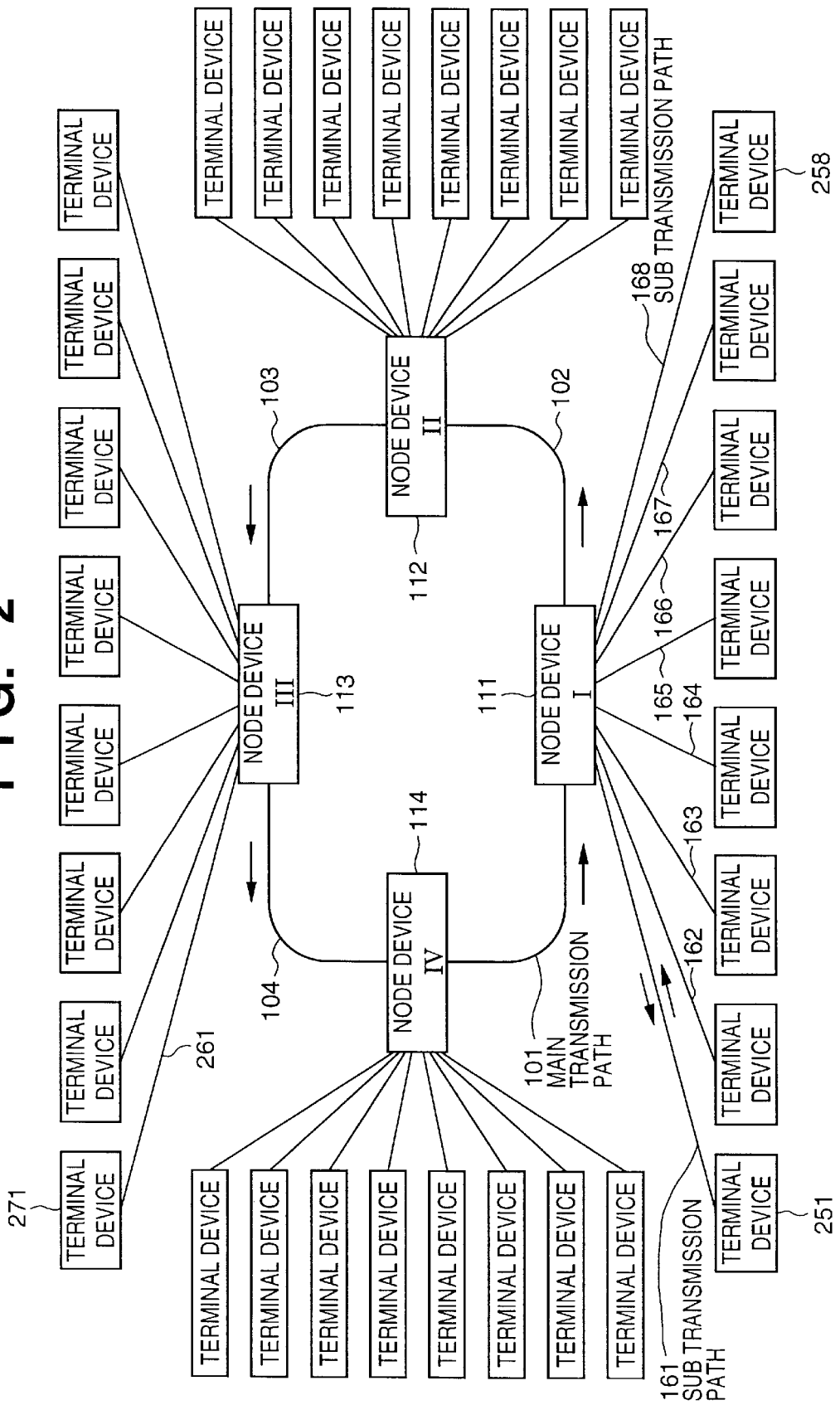
FIG. 2 is a diagram showing the arrangement of a network according to the first embodiment of the present invention.

FIG. 2 shows the arrangement of a network system using the node device according to the first embodiment of the present invention shown in FIG. 1. In this network system, four node devices are connected in a loop pattern using multi-channel main transmission paths. Each arrow indicates the transmission direction of a packet signal. The four node devices have the same internal arrangement, as shown in FIG. 1.

Referring to FIG. 1, reference numerals 101-1 to 101-8 and 102-1 to 102-8 denote optical fibers serving as transmission media that make up main transmission paths. Eight optical fibers are prepared in correspondence with eight channels, and form main transmission paths 101 and 102 as a whole. The optical fibers 101-1 to 101-8 are used for sending signals coming from the upstream neighboring node device, and the optical fibers 102-1 to 102-8 are used for sending signals to the downstream neighboring node device. Reference numerals 121 to 128 denote receivers I to VIII serving as reception means for receiving optical signals sent via the optical fibers 101-1 to 101-8. Reference numerals 141 to 148 denote insertion units I to VIII serving as insertion means, and each having a function of inserting a packet which was transmitted from one of terminal devices connected via sub transmission paths 161-1 to 168-1 and has undergone processing (to be described later) into a packet flow output from the corresponding receiver. Reference numerals 131 to 138 denote separation units I to VIII serving as separation means, and each having a function of separating a packet to be sent to a terminal device or the like connected via one of sub transmission paths 161-2 to 168-2 from the packet flow output from the corresponding insertion unit. Reference numerals 151 to 158 denote transmitters I to VIII serving as transmission means for transmitting optical signals. Each of the transmitters I to VIII converts a packet output from the corresponding separation unit into an optical signal, and outputs the optical signal onto a corresponding one of the optical fibers 102-1 to 102-8 which make up the main transmission path 102.

Reference numerals 161-1 to 168-1 and 161-2 to 168-2 denote sub transmission paths used for connecting terminal devices and the like to a node device 111 The sub transmission paths 161-1 to 168-1 are input paths for transmitting signals from the terminal devices and the like to the node device 111, and the sub transmission paths 161-2 to 168-2 are output paths for transmitting signals from the node device 111 to the terminal device and the like. In this embodiment, eight pairs of input and output sub transmission paths (161-1 and 161-2, . . . , 168-1 and 168-2) are prepared, and a pair of sub transmission paths is connected to each terminal device or the like. Reference numerals 171 to 178 denote reception I/Fs I to VIII for receiving packet signals sent via the input sub transmission paths 161-1 to 168-1 and forming and outputting packets suitable for the internal processing of the node device 111. Reference numerals 181 to 188 denote first buffers I to VIII serving as first buffer means. Each of the first buffers 181 to 188 has a function of temporarily storing a packet output from the corresponding reception I/F. Reference numeral 191 denotes a first buffer controller serving as a first buffer control means. The first buffer controller 191 controls the read of packets stored in the first buffers I to VIII in accordance with connections between the input and output terminals of a connection change means set by a connection change controller (to be described later). Reference numeral 201 denotes a first connection change unit serving as a first connection change means, which has eight input terminals and eight output terminals. The input terminals I to VIII of the first connection change unit 201 are respectively connected to the first buffers I to VIII, and its output terminals I to VIII are respectively connected to the insertion units I to VIII. The first connection change unit 201 has a function of distributing packets input to its input terminals to the output terminals I to VIII in accordance with a predetermined connection pattern (to be described later). Reference numeral 202 denotes a first connection change controller for controlling the connections between the input and output terminals of the first connection change unit in accordance with a predetermined connection change pattern (to be described later).

Reference numerals 211 to 218 denote second buffers I to VIII serving as second buffer means. Each of the second buffers I to VIII has a function of temporarily storing a packet separated by and output from a corresponding one of the separation units I to VIII.

Figure 11:
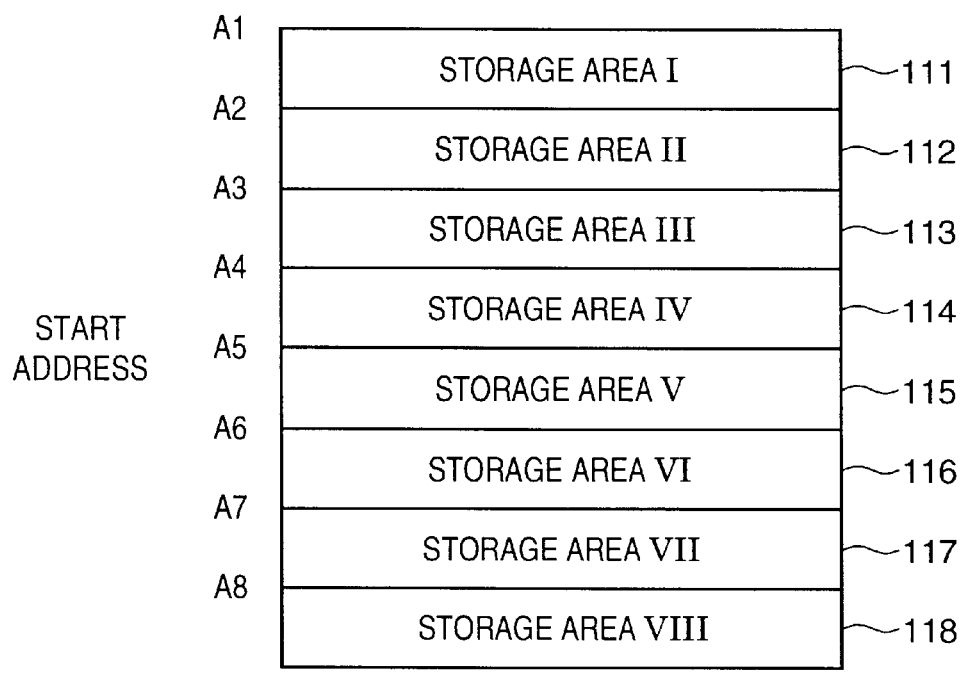
FIG. 11 shows the arrangement of the storage areas of a second buffer in an embodiment of the present invention.

Each of the second buffers I to VIII has storage areas shown in FIG. 11, which respectively store packets to be output onto different sub transmission paths.

For example, in FIG. 11 the storage area I 111 stores a packet to be output onto the sub transmission path 161-2, and the storage area VIII 118 stores a packet to be output onto the sub transmission path 168-2. That is, the second buffers store data in units of destinations of data.

Reference numeral 221 denotes a second buffer controller serving as a second buffer control means, which controls the read of packets stored in the respective storage areas of the second buffers I to VIII in accordance with the connections between the input and output terminals of a connection change means set by a connection change controller (to be described later). Reference numeral 231 denotes a second connection change unit serving as a second connection change means, which has eight input terminals and eight output terminals. The input terminals I to VIII of the second connection change unit 231 are respectively connected to the second buffers I to VIII, and their output terminals I to VIII are connected to transmission I/Fs I to VIII. The second connection change unit 231 has a function of connecting packets input to its input terminals to desired output terminals in accordance with a predetermined connection pattern (to be described later). The second buffer controller 221 outputs packets stored in the storage areas I 111 to VIII 118 of the second buffers to the input terminals of the second connection change unit corresponding to these storage areas. More specifically, the controller 221 controls to output a packet stored in the storage area I of each buffer to the input terminal I, a packet stored in the storage area II to the input terminal II, and packets stored in the storage areas III to VIII to the input terminals III to VIII, respectively. Reference numeral 232 denotes a second connection change controller, which controls the connections between the input and output terminals of the second connection change unit 231 in accordance with a predetermined change pattern (to be described later). Reference numerals 241 to 248 denote transmission I/Fs I to VIII for respectively receiving packets output from the output terminals I to VIII of the second connection change unit 231, and forming and outputting packets suitable for transmission via the sub transmission paths. These transmission I/Fs I to VIII are respectively connected to the sub transmission paths 161-2 to 168-2.

Referring to FIG. 2, reference numerals 111 to 114 denote node devices each having the arrangement shown in FIG. 1, and each connected with eight terminal devices via eight sub transmission paths. Reference numerals 101 to 104 denote main transmission paths each made up of eight optical fibers. The main transmission paths 101 and 102 correspond to those denoted by the same reference numerals in FIG. 1. Also, the main transmission paths 102 and 103, 103 and 104, and 104 and 101 in FIG. 2 respectively correspond to the main transmission paths 101 and 102 in FIG. 1. The sub transmission paths 161 to 168 connected to the node device 111 in FIG. 2 respectively correspond to the sub transmission paths 161 to 168 in FIG. 1.

Figure 3:
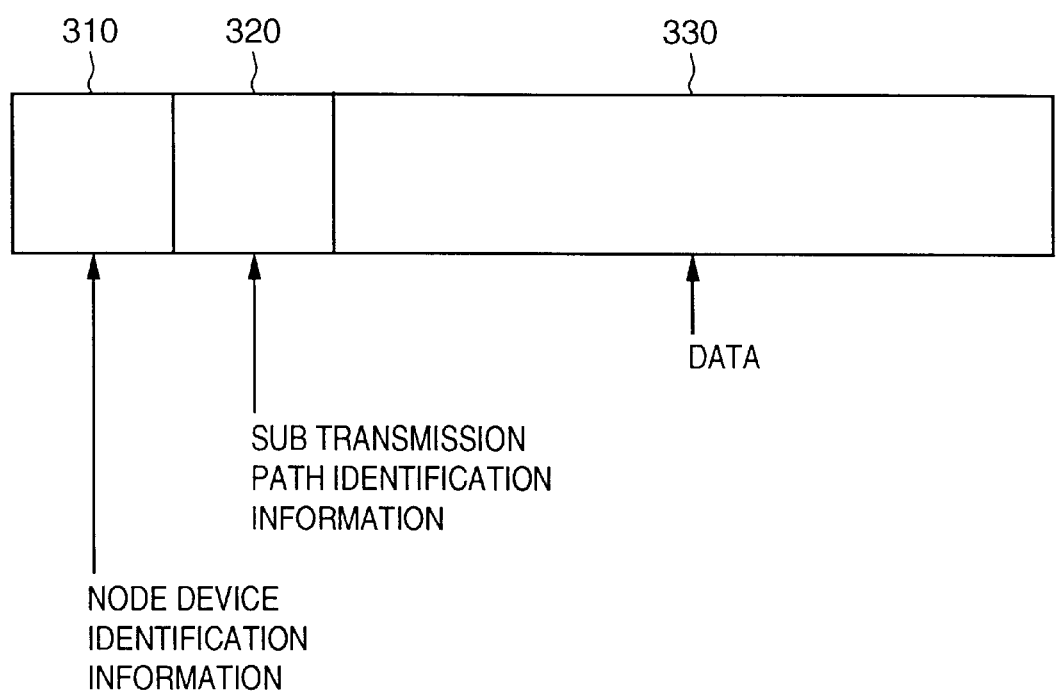
FIG. 3 shows the packet format in the first embodiment of the present invention.

FIG. 3 shows an example of the packet format used in the first embodiment. Reference numeral 310 denotes a field that describes node device identification information of a packet. More specifically, the field 310 describes a node address for identifying a node device to which the sub transmission path connected with the destination terminal device of a packet is connected. Reference numeral 320 denotes a field for describing sub transmission path identification information of a packet. More specifically, the field 320 describes a sub transmission address for identifying the sub transmission path to which the destination terminal device of a packet is connected. Reference numeral 330 denotes a data field in which data to be transmitted by this packet is inserted.

Figure 4:
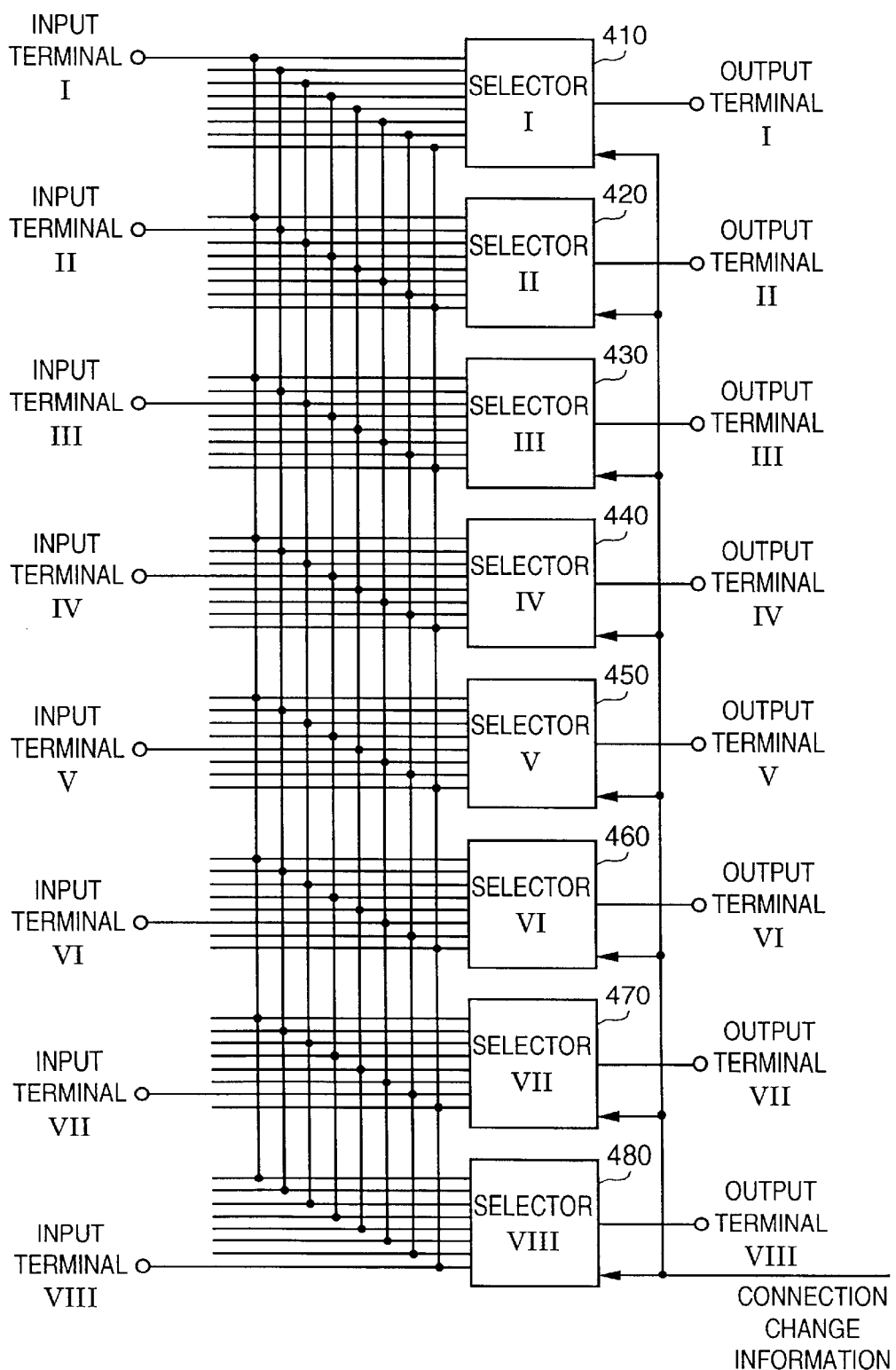
FIG. 4 is a block diagram showing the arrangement of a connection change unit according to the first embodiment of the present invention.

FIG. 4 shows the internal arrangement of the first and second connection change units used in the first embodiment of the present invention. In the description of this embodiment, the first and second connection change units have the same arrangement, but may have different arrangements as long as they have equivalent functions. The connection change unit has eight input terminals and eight output terminals. Reference numerals 410 to 480 denote selectors I to VIII, each of which receives eight signals from the input terminals I to VIII, and outputs a packet input from a predetermined input terminal on the basis of a selection signal output from the corresponding connection change controller. In this way, the connections between the input and output terminals are set up.

FIG. 5A is a timing chart showing an example of the connections between the input and output terminals of the first connection change unit in this embodiment, and shows an example of a connection pattern made up of eight consecutive operation periods T1, T2, T3, T4, T5, T6, T7, and T8. FIG. 5B is a timing chart showing an example of the connections between the input and output terminals of the second connection change unit in this embodiment, and shows an example of a connection pattern made up of eight consecutive operation periods T1', T2', T3', T4', T5', T6', T7', and T8'.

The operation of the first embodiment of the present invention will be explained below with reference to FIGS. 1, 2, 3, 4, 5A, and 5B.

Packet communications will be exemplified while taking as an example a case wherein the source terminal device is a terminal device 251 connected to the sub transmission path 161 (161-1 and 161-2) of the node device I 111 (FIG. 2), and the destination is a terminal device 271 connected to a sub transmission path 261 of the node device III 113. In the following description, the same components in different node devices will be denoted by the same reference numerals as in FIGS. 1 to 4 for the sake of simplicity.

The source terminal device 251 connected to the sub transmission path 161 (161-1 and 161-2) of the node device I 111 assembles transmission packets in the format shown in FIG. 3 by adding the node address value of the node device III 113 as the destination, and the sub transmission path address value of the sub transmission path 261 to data to be sent to the terminal device 271 connected to the sub transmission path 261 of the node device III 113, and sends the packets to the reception I/F I 171 of the node device I 111 via the sub transmission path 161-1. The reception I/F I 171 converts the received packets into those suitable for transmission between node devices, and outputs the converted packets to the first buffer I 181.

Note that a packet having a fixed length such as an ATM (Asynchronous Transfer Mode) cell used in an ATM is particularly suitable for transmission between node devices.

The first buffer I 181 sequentially writes the input packets in its internal memory. On the other hand, the first connection unit 201, the input terminals I to VIII of which are respectively connected to the first buffers I 181 to VIII 188, and the output terminals I to VIII of which are respectively connected to the insertion units I 141 to VIII 148, changes the connections between the input terminals I to VIII and the output terminals I to VIII, in units of operation periods T1, T2, T3, T4, T5, T6, T7, and T8, in the pattern shown in FIG. 5A under the control of the first connection change controller 202. More specifically, during the operation period T1 in which the input terminal I connected to the first buffer I 181 is connected to the output terminal I, a packet written in the internal memory of the first buffer I 181 is read out under the control of the first buffer controller 191, and is output to the output terminal I of the first connection change unit. Subsequently, during the operation period T2 in which the input terminal I is connected to the output terminal II, a packet written in the internal memory of the first buffer I 181 is read out under the control of the first buffer controller 191, and is output to the output terminal II of the first connection change unit. The same operations similarly repeat during the operation periods T3 to T8. Upon completion of the period T8, the operations during the operation periods T1 to T8 repeat. With these operations, the packets output from the terminal device 251 and sent via the sub transmission path 161-1 are sequentially distributed to the output terminals I to VIII of the first connection change unit, and are output to the insertion units I 141 to VIII 148 to which the output terminals I to VIII are respectively connected. The insertion units I 141 to VIII 148 find empty packets without any node device identification information from the packet flows respectively output from the receivers I 121 to VIII 128 connected thereto, insert the packets output from the output terminals I to VIII of the first connection change unit 201 into these packets, and output these packets to the separation units I 131 to VIII 138. The separation units I 131 to VIII 138 separate packets having the node address of the node device to which they belong. In this case, since the destination address described in each packet indicates the terminal device 271, the separation units I 131 to VIII 138 do not separate these packets, and output them to the transmitters I 151 to VIII 158. The transmitters I 151 to VIII 158 convert the input packet signals into optical signals using semiconductor lasers (or light-emitting diodes), and output these optical signals onto the optical fibers 102-1 to 102-8 connected thereto.

The packet signals output from the terminal device 251 are equally distributed onto the eight channels that make up the main transmission path, and are input to the neighboring node device II 112. Since the node address value of the node device III 113 is described as the node device identification information in each packet, the node device II 112 relays these packets. More specifically, the packets converted into the optical signals and sent via the individual channels are converted into electrical signals by the receivers I 121 to VIII 128 of the corresponding channels, and the electrical signals are output to the insertion units I 141 to VIII 148. The insertion units I 141 to VIII 148 execute the above-mentioned packet insertion if there are packets to be inserted output from the terminal devices, and directly input the packets from the terminal device 251 to the separation units I 131 to VIII 138. In these separation units I 131 to VIII 138, since these packets do not describe the corresponding node address value, they are directly output to the transmitters I 151 to VIII 158 without being separated. The transmitters I 151 to VIII 158 convert these packets into optical signals again, and input the optical signals to the neighboring node device III 113 via the main transmission path 103.

The operation in the node device III 113 as the destination will be explained below. The packet signals, which are output from the terminal device 251 and are input to the node device III 113 while being distributed onto the eight channels that make up the main transmission path 103, are received by the receivers I 121 to VIII 128, and are respectively input to the insertion units I 141 to VIII 148. The insertion units I 141 to VIII 148 execute the above-mentioned packet insertion if there are packets to be inserted output from the terminal devices, and directly input the packets from the terminal device 251 to the separation units I 131 to VIII 138. The separation units I 131 to VIII 138 discriminate and separate packets that describe the node address value of the node device III 113 from the input packet flows, and output the separated packets to the second buffers I 211 to VIII 218. At this time, the separation units I 131 to VIII 138 insert empty packets at the positions of the separated packets, and output them to the transmitters I 151 to VIII 158.

The second buffers I 211 to VIII 218 sequentially write the input packets in the storage areas corresponding to the sub transmission path to which the destination terminal of the packets is connected. More specifically, in this case, since the packets are transmitted toward the terminal device connected to the sub transmission path 261, the packets are sequentially written in the storage areas I 111 in the second buffers I 211 to VIII 218. On the other hand, the second connection change unit 231, the input terminals I to VIII of which are connected to the second buffers I 211 to VIII 218, and the output terminals I to VIII of which are connected to the transmission I/Fs I 241 to VIII 248, changes the connections between the input terminals I to VIII and the output terminals I to VIII, in units of operation periods T1', T2', T3', T4', T5', T6', T7', and T8', in the pattern shown in FIG. 5B under the control of the second connection change controller 232. Assuming that the sub transmission path 261 to which the destination terminal device 271 is connected corresponds to the sub transmission path 161-2 in FIG. 1, since this sub transmission path is connected to the transmission I/F I 241, the following operations are done to output to this I/F the packets which have been sent while being distributed onto different channels. More specifically, during the operation period T1' in which the input terminal I connected to the second buffer I 211 is connected to the output terminal I, a packet written in the storage area I 111 in the second buffer I 211 is read out under the control of the second buffer controller 221. If the sub transmission path address value of that packet is concordant with the sub transmission path 261 (corresponding to 161) to which the terminal device 271 is connected, the packet is output to the input terminal I of the second connection change unit 231 and is output from the output terminal II of the second connection change unit 231. Subsequently, during the operation period T2' in which the input terminal II is connected to the output terminal I, a packet written in the storage area I of the second buffer II 212 is read out under the control of the second buffer controller. If the sub transmission path address value of that packet is concordant with the sub transmission path 261 (corresponding to 161) to which the terminal device 271 is connected, the packet is output to the input terminal II of the second connection change unit 231, and is output from the output terminal I thereof. The same operations similarly repeat during the operation periods T3' to T8'. Upon completion of the period T8', the operations during the operation periods T1' to T8' repeat. With these operations, the packets, which are output from the terminal device 251, are sent while being distributed onto the eight channels that make up the main transmission path, and are written in the storage areas I 111 in the second buffers I 211 to VIII 218, are collected to the sub transmission path to which the destination terminal device is connected by the connection function of the second connection change unit 231, and are sent to the destination terminal device.

To summarize, since traffic can be prevented from being concentrated on a specific channel of the main transmission path by the communication method using the connection change units with a simple arrangement and control method, packet communications that can efficiently use the communication capacity of the main transmission path can be realized.

Packet communications between different terminal devices connected to an identical node device will be explained below. More specifically, packet communications will be exemplified while taking as an example a case wherein the source terminal device is the terminal device 251 connected to the sub transmission path 161 of the node device I 111 (FIG. 2), and the destination is a terminal device 258 connected to the sub transmission path 168 of the identical node device I 111. The source terminal device 251 connected to the sub transmission path 161 (161-1 and 161-2) of the node device I 111 assembles transmission packets in the format shown in FIG. 3 by adding the node address value of the node device I 111 as the destination, and the sub transmission path address value of the sub transmission path 168 to data to be sent to the terminal device 258 connected to the sub transmission path 168 of the node device I 111, and sends those packets to the reception I/F I 171 of the node device I 111 via the sub transmission path 161-1. The operations until the packets input to the reception I/F I 171 are input to the separation units I 131 to VIII 138 via the insertion units I 141 to VIII 148 are the same as those in the above description. The separation units I 131 to VIII 138 discriminate and separate packets that describe the node address value of the node device I 111, and output them to the second buffers I 211 to VIII 218. At this time, the separation units I 131 to VIII 138 insert empty packets at the positions of the separated packets, and output them to the transmitters I 151 to VIII 158.

The second buffers I 211 to VIII 218 sequentially write the input packets in the storage areas VIII 118 corresponding to the sub transmission path 168 to which the destination terminal device 258 is connected. On the other hand, the second connection change unit 231, the input terminals I to VIII of which are connected to the second buffers I 211 to VIII 218, and the output terminals I to VIII of which are connected to the transmission I/Fs I 241 to VIII 248, changes the connections between the input terminals I to VIII and the output terminals I to VIII, in units of operation periods T1', T2', T3', T4', T5', T6', T7', and T8', in the pattern shown in FIG. 5B under the control of the second connection change controller 232. Assuming that the sub transmission path 168 to which the destination terminal device 258 is connected corresponds to the sub transmission path 168-2 in FIG. 1, since this sub transmission path is connected to the transmission I/F VIII 248, the following operations are done to output to this I/F the packets which have been sent from the separation units I 131 to VIII 138 while being distributed. More specifically, during the operation period T2' in which the input terminal I connected to the second buffer I 211 is connected to the output terminal VIII, a packet written in the storage area VIII in the second buffer I 211 is read out under the control of the second buffer controller 221. If the sub transmission path address value of that packet is concordant with the sub transmission path 168 to which the terminal device 258 is connected, the packet is output to the input terminal I of the second connection change unit 231 and is output from the output terminal VIII thereof. Subsequently, during the operation period T3' in which the input terminal II is connected to the output terminal VIII, a packet written in the internal memory of the second buffer I 212 is read out under the control of the second buffer controller. If the sub transmission path address value of that packet is concordant with the sub transmission path 168 to which the terminal device 258 is connected, the packet is output to the input terminal II of the second connection change unit 231, and is output from the output terminal VIII thereof. The same operations similarly repeat during the operation periods T3' to T8'. Upon completion of the period T8', the operations during the operation periods T1' to T8' repeat. With these operations, the packets, which are output from the terminal device 251, are sent while being distributed onto the eight channels that make up the main transmission path, and are written in the storage areas VIII in the second buffers I 211 to VIII 218, are collected to the sub transmission path to which the destination terminal device is connected by the connection function of the second connection change unit 231, and are sent to the destination terminal device.

To recapitulate, according to this embodiment, since packets are not output onto the main transmission path in packet communications between terminal devices connected to an identical node, the use efficiency of channels between neighboring node devices can be improved.

In the two cases described in this embodiment, optical fibers are used as transmission media that make up the main transmission path. Alternatively, communications between node devices may be attained using electrical signals via copper wires or the like. In such case, the need for the receivers that perform opto-electric conversion and the transmitters that perform electro-optic conversion can be obviated. When the signal format suitable for communications between nodes is preferably different from that in the node device, the signal format may be converted by a driver.

Second Embodiment

Figure 6A:
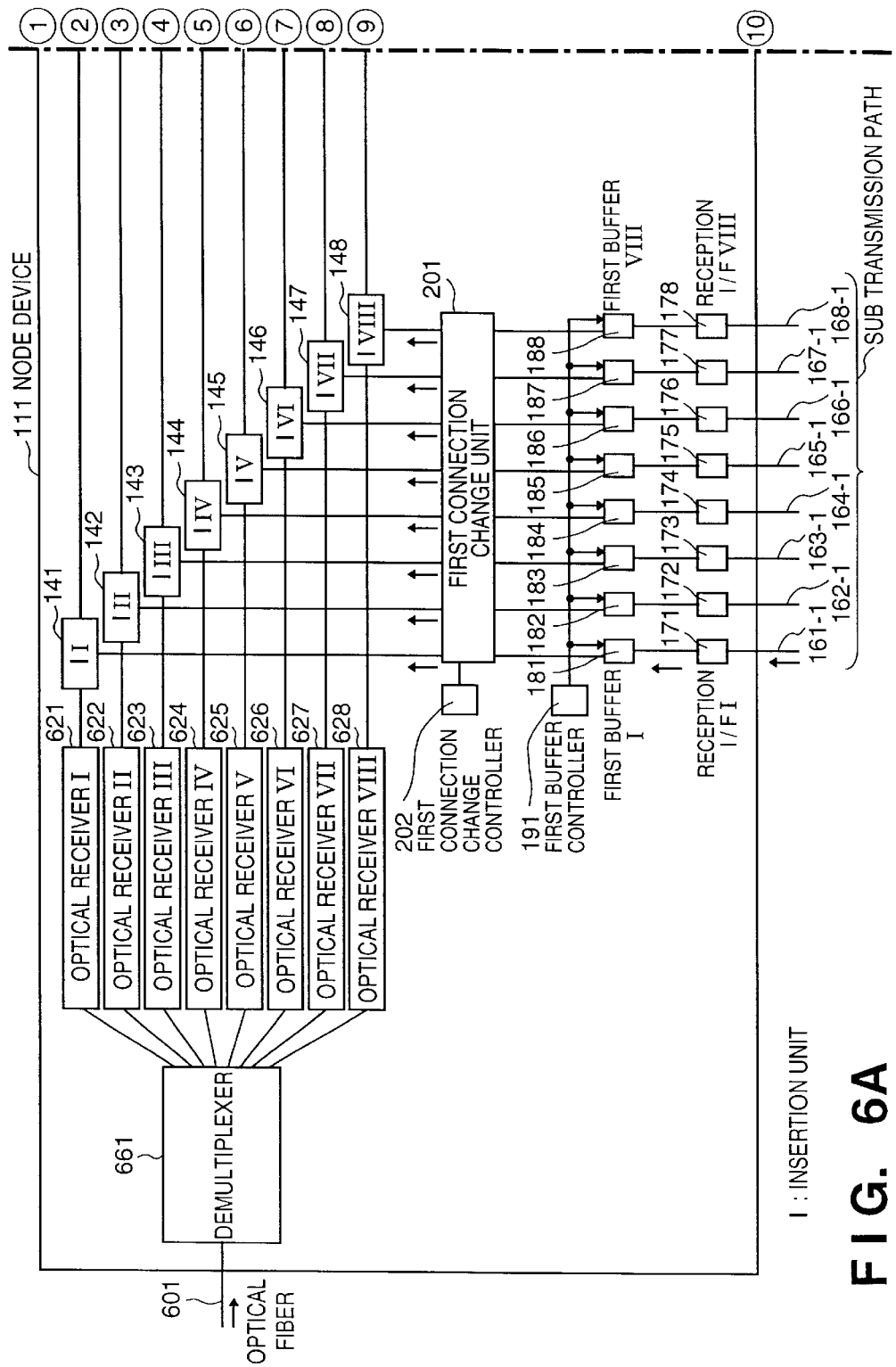
FIGS. 6A and 6B are block diagrams showing the arrangement of a node device according to the second embodiment of the present invention.
Figure 6B:
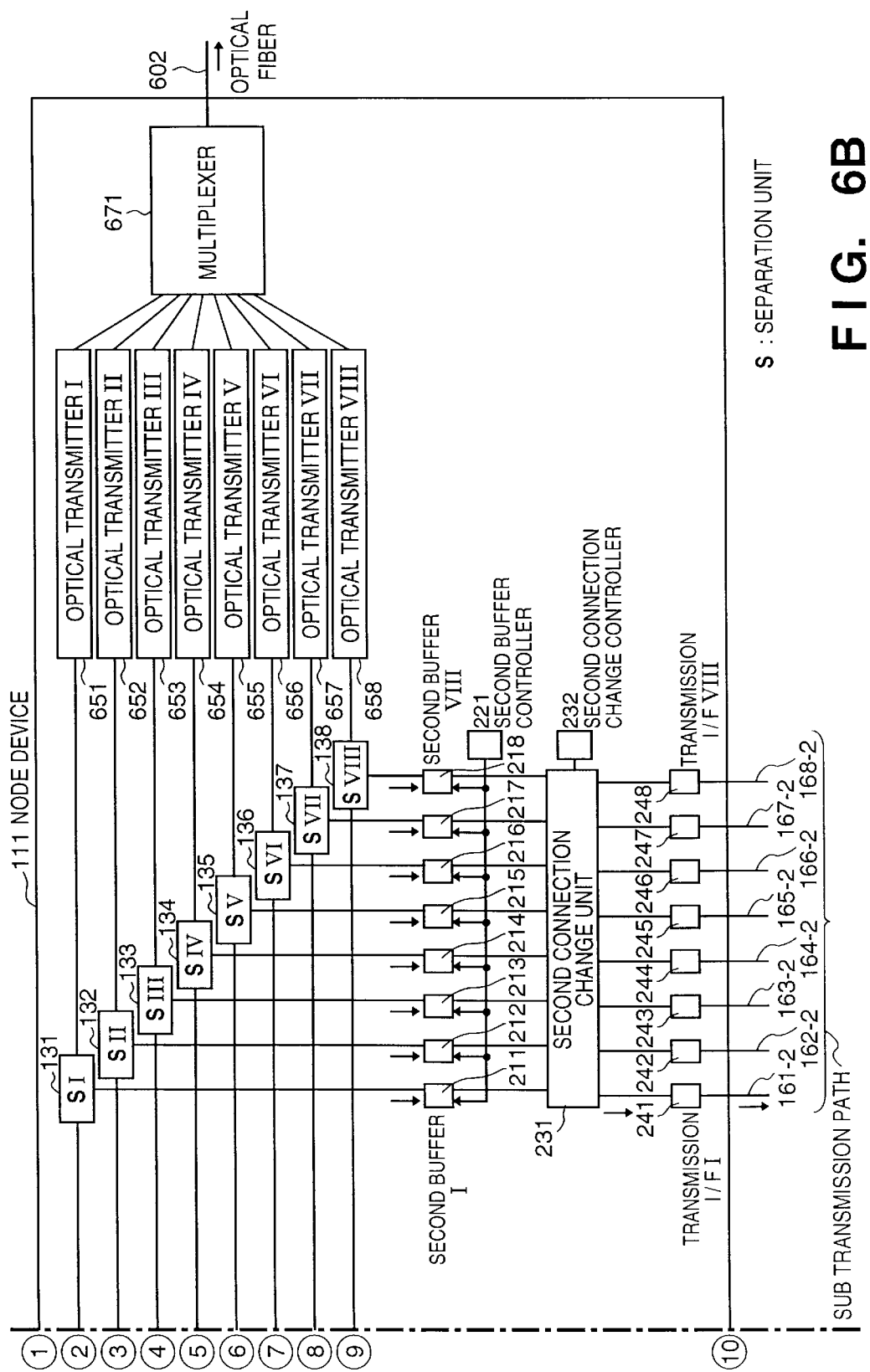

The second embodiment of the present invention will be described below with reference to FIGS. 6A and 6B. FIGS. 6A and 6B show a node device according to the second embodiment of the present invention. The arrangement of the node device of the second embodiment is substantially the same as that of the node device of the first embodiment shown in FIG. 1, except that the receivers I 121 to VIII 128 in FIG. 1 are replaced by optical receivers I 621 to VII 628, the transmitters I 151 to VIII 158 in FIG. 1 are replaced by optical transmitters I 651 to VIII 658, a wavelength demultiplexer 661 is inserted between an optical fiber 601 as the input-side main transmission path, and the optical receivers I 621 to VIII 628, and a wavelength multiplexer 671 is inserted between an optical fiber 602 as the output-side main transmission path, and the optical transmitters I 651 to VIII 658. Other arrangements are the same as those in FIG. 1, and the same reference numerals denote portions having the same functions.

The optical transmitters I 651 to VIII 658 have the same function of converting signals from the separation units I 131 to VIII 138 connected thereto into optical signals and outputting them onto the main transmission path 602 as in the first embodiment, but the optical wavelengths of optical signals output from the optical transmitters I 651 to VIII 658 are different from each other. More specifically, if $\lambda 1$, $\lambda 2$, $\lambda 3$, $\lambda 4$, $\lambda 5$, $\lambda 6$, $\lambda 7$, and $\lambda 8$ respectively represent the optical wavelengths of optical signals output from the optical transmitters I 651 to VIII 658, these optical signals are multiplexed by the wavelength multiplexer 671, and the multiplexed signal is output onto the main transmission path 602 comprising a single optical fiber. Although the main transmission path comprises a single optical fiber as a transmission medium, eight multi-channel transmission paths are formed by optical wavelength multiplex. On the other hand, the optical receivers I 621 to VIII 628 have a function of converting input optical signals into electrical signals, and outputting the converted signals to the insertion units I 141 to VIII 148, respectively. The wavelength multiplexed signal sent via the optical fiber 601 serving as the main transmission path is input to the wavelength demultiplexer 661, and is demultiplexed into optical signals of eight different wavelengths $\lambda 1$ to $\lambda 8$. These demultiplexed optical signals are respectively input to the optical receivers I to VIII.

The communication operations of the node device of the second embodiment are substantially the same as those described in the first embodiment, except that packets distributed onto the eight channels are sent between the node devices by wavelength multiplex, and a detailed description thereof will be omitted. Note that a network system using the node device of the second embodiment can use the same arrangement as that shown in FIG. 2.

Third Embodiment

The third embodiment of the present invention will be described below with reference to FIG. 7 and FIGS. 8A and 8B.

Figure 7:
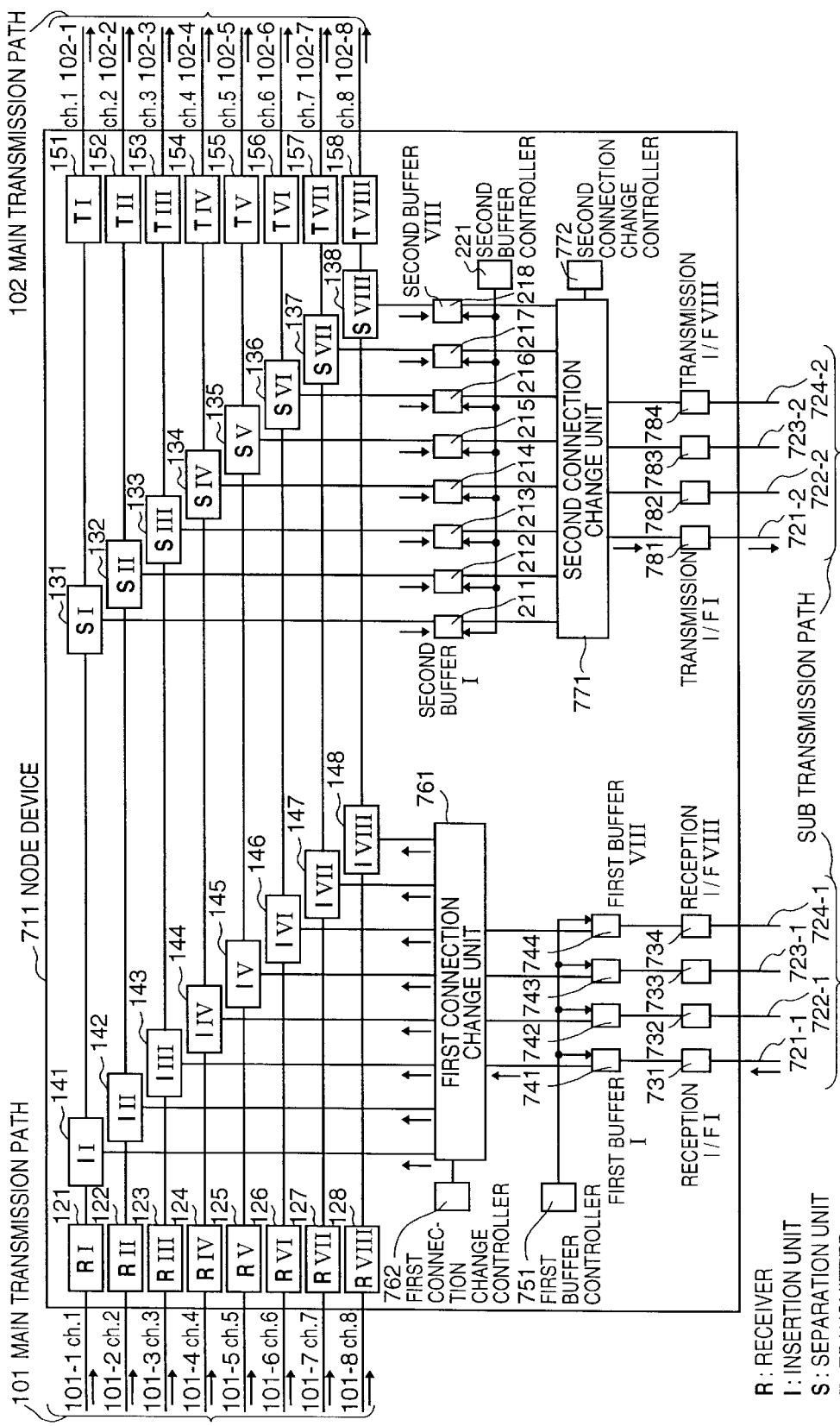
FIG. 7 is a block diagram showing the arrangement of a node device according to the third embodiment of the present invention.
Figure 9:
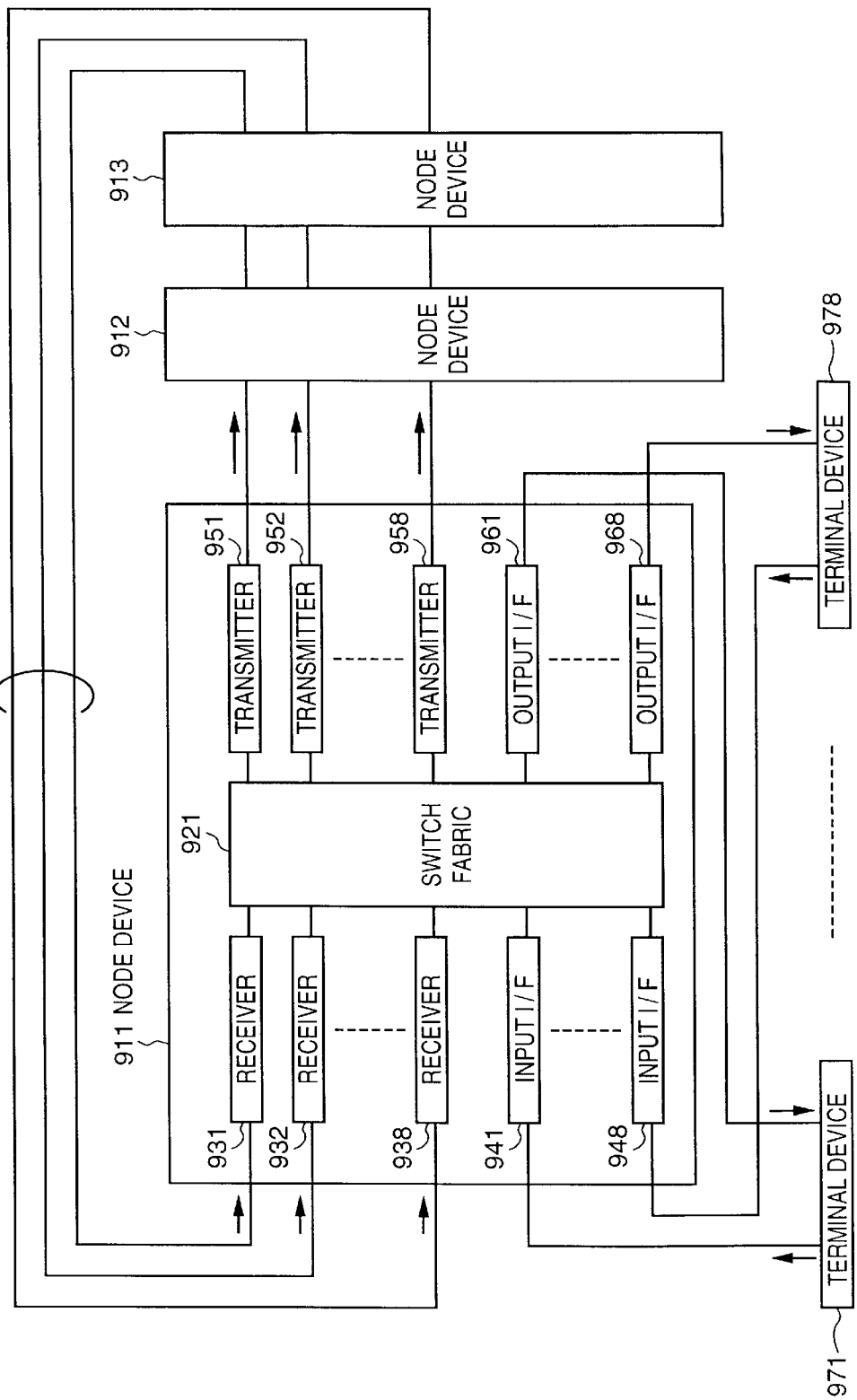
FIG. 9 is a block diagram showing the arrangement of a conventional network system.
Figure 12:
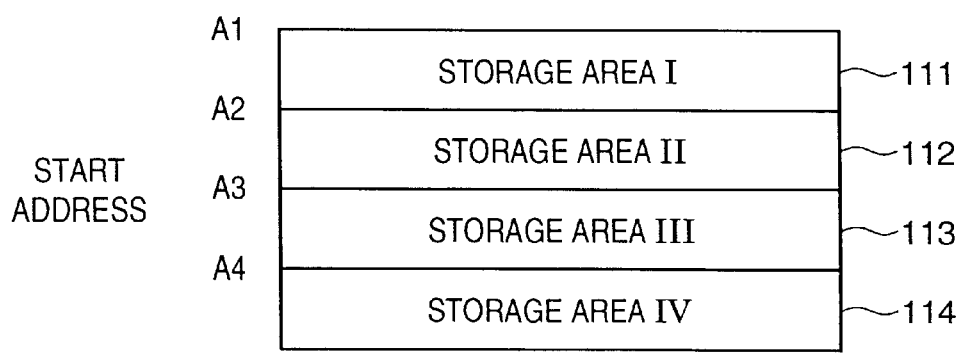
FIG. 12 shows the arrangement of the storage areas of a second buffer in the third embodiment of the present invention.

FIG. 7 shows a node device according to the third embodiment of the present invention, i.e., an example of a node device which connects four sub transmission paths to a main transmission path in a network system using a main transmission path having eight channels. The arrangement of the node device shown in FIG. 7 is substantially the same as that of the node device of the first embodiment shown in FIG. 1, and the same reference numerals denote portions having the same functions. The difference from the first embodiment is that the number of sub transmission paths connected is four. Accordingly, the number of reception I/Fs is four (reception I/Fs I 732 to IV 734), the number of first buffers is four (first buffers I 741 to IV 744), the number of input terminals of a first connection change unit 761 connected to these buffers is four (input terminals I to IV), the number of output terminals of a second connection change unit 771 is four (output terminals I to IV), and the number of transmission I/Fs connected to these output terminals is four (transmissions I/Fs I 781 to IV 784). Hence, the second buffers I to VIII have storage areas I to IV, as shown in FIG. 12. Note that a connection change unit, the number of input terminals of which is changed to four in FIG. 4, is used as the first connection change unit, and a connection change unit, the number of output terminals of which is changed to four in FIG. 4, is used as the second connection change unit.

FIG. 8A is a timing chart showing an example of the connections between the four input terminals and eight output terminals of the first connection change unit 761 in this embodiment, i.e., an example of a connection pattern made up of eight consecutive operation periods T1, T2, T3, T4, T5, T6, T7, and T8. FIG. 8B is a timing chart showing an example of the connections between the eight input terminals and four output terminals of the second connection change unit 771 in this embodiment, i.e., an example of a connection pattern made up of eight consecutive operation periods T1', T2', T3', T4', T5', T6', T7', and T8'. A network system using the node device of this embodiment can use the same arrangement as that shown in FIG. 2.

The operation of the third embodiment of the present invention will be described below with reference to FIG. 7 and FIGS. 8A and 8B. In this embodiment, since the connection change operations of the first and second connection change units are different from those in the first embodiment, and other operations are the same as those in the first embodiment, only different operations will be explained. For the sake of simplicity, assume that packet signals input from an input-side sub transmission path 721-1 are output onto the main transmission path 102, are relayed by other node devices, are then input to a node device having the same arrangement as that of the node device shown in FIG. 7 (the same reference numerals are also used), and are output from an output-side sub transmission path 721-2 of this node device.

Packets input to the sub transmission path 721-1 are input to the first buffer I 741 via the reception I/F 731, and are sequentially written in the internal memory. On the other hand, the first connection change unit 761, the input terminals I to IV of which are connected to the first buffers I 741 to IV 744, and the output terminals I to VIII of which are connected to the insertion units I 141 to VIII 148, changes the connections between the input terminals I to IV and the output terminals I to VIII, in units of operation periods T1, T2, T3, T4, T5, T6, T7, and T8, in the pattern shown in FIG. 8A under the control of the first connection change controller 762. More specifically, during the operation period T1 in which the input terminal I connected to the first buffer I 741 is connected to the output terminal I, a packet written in the internal memory of the first buffer I 741 is read out under the control of a first buffer controller 751, and is output to the input terminal I of the first connection change unit, thus outputting the packet from the output terminal I thereof. Subsequently, during the operation period T2 in which the input terminal I is connected to the output terminal II, a packet written in the internal memory of the first buffer I 741 is read out under the control of the first buffer controller 751, and is output to the input terminal I of the first connection change unit, thus outputting the packet from the output terminal II thereof. The same operations similarly repeat during the operation periods T3 to T8. Upon completion of the period T8, the operations during the operation periods T1 to T8 repeat. With these operations, the packets sent via the sub transmission path 721-1 are sequentially distributed to the output terminals I to VIII of the first connection change unit, and are output onto the individual channels of the main transmission path 102 in the same manner as in the first embodiment.

In the node device connected with the destination terminal device of the packets, the packet signals, which are input to that node device while being distributed onto the eight channels that make up the main transmission path, are input to the second buffers I 211 to VIII 218 via the receivers I 121 to VIII 128, insertion units I 141 to VIII 148, and separation units I 131 to VIII 138 in the same manner as in the first embodiment, and are written in corresponding ones of the storage areas I to VI. In this case, the packets are written in the storage areas I. On the other hand, the second connection change unit 771, the input terminals I to VIII of which are connected to the second buffers I 211 to VIII 218, and the output terminals I to IV of which are connected to the transmission I/Fs I 781 to IV 784, changes the connections between the input terminals I to VIII and the output terminals I to IV, in units of operation periods T1', T2', T3', T4', T5', T6', T7', and T8', in the pattern shown in FIG. 8B under the control of the second connection change controller 232. Since the output-side sub transmission path 721-2 serving as the destination is connected to the transmission I/F I 781, the following operations are done to output to this I/F the packets that have been sent while being distributed onto different channels. More specifically, during the operation period T1' in which the input terminal I connected to the second buffer I is connected to the output terminal I, a packet written in the storage area I of the second buffer I 211 is read out under the control of the second buffer controller 221. If the sub transmission path address value of that packet is concordant with the sub transmission path 721, the packet is output to the input terminal I of the second connection change unit, and is output from the output terminal I thereof. During the subsequent operation period T2', since the input terminal VIII is connected to the output terminal I, a packet written in the storage area I of the second buffer VIII is read out under the control of the second buffer controller. If the sub transmission path address value of that packet is concordant with the sub transmission path 721, the packet is output to the input terminal VIII of the second connection change unit, and is output from the output terminal I thereof.

The same operations similarly repeat during the operation periods T7' and T8'. Upon completion of the period T8', the operations during the operation periods T1' to T8' repeat. With these operations, packets, which are sent while being distributed onto the eight channels that make up the main transmission path, are written in the storage areas I of the second buffers I to VIII, and are addressed to a desired sub transmission path, are collected to the desired sub transmission path and are sent to the destination terminal device.

In the above embodiments, the number of channels in the main transmission path is eight. However, the number of channels is not particularly limited to eight.

In the third embodiment, as an example wherein the number of sub transmission paths is different from that of channels of the main transmission path, the number of channels in the main transmission path is eight, and the number of sub transmission paths is four. However, the number of sub transmission paths is not particularly limited to four.

In the above embodiments, the operation periods T1 to T8 of the first connection change unit are different from the operation periods T1' to T8' of the second connection change unit, but may be equal to each other.

In the above embodiment, the insertion units are arranged on the input side of the separation units in the node device, so that signals to terminal devices connected to an identical node device can be sent without going out that node device. However, the present invention is not limited to such specific arrangement. The embodiments to be described hereinafter have an arrangement in which the separation units are arranged at the input side of the insertion unit in the node device.

Fourth Embodiment

Figure 10:
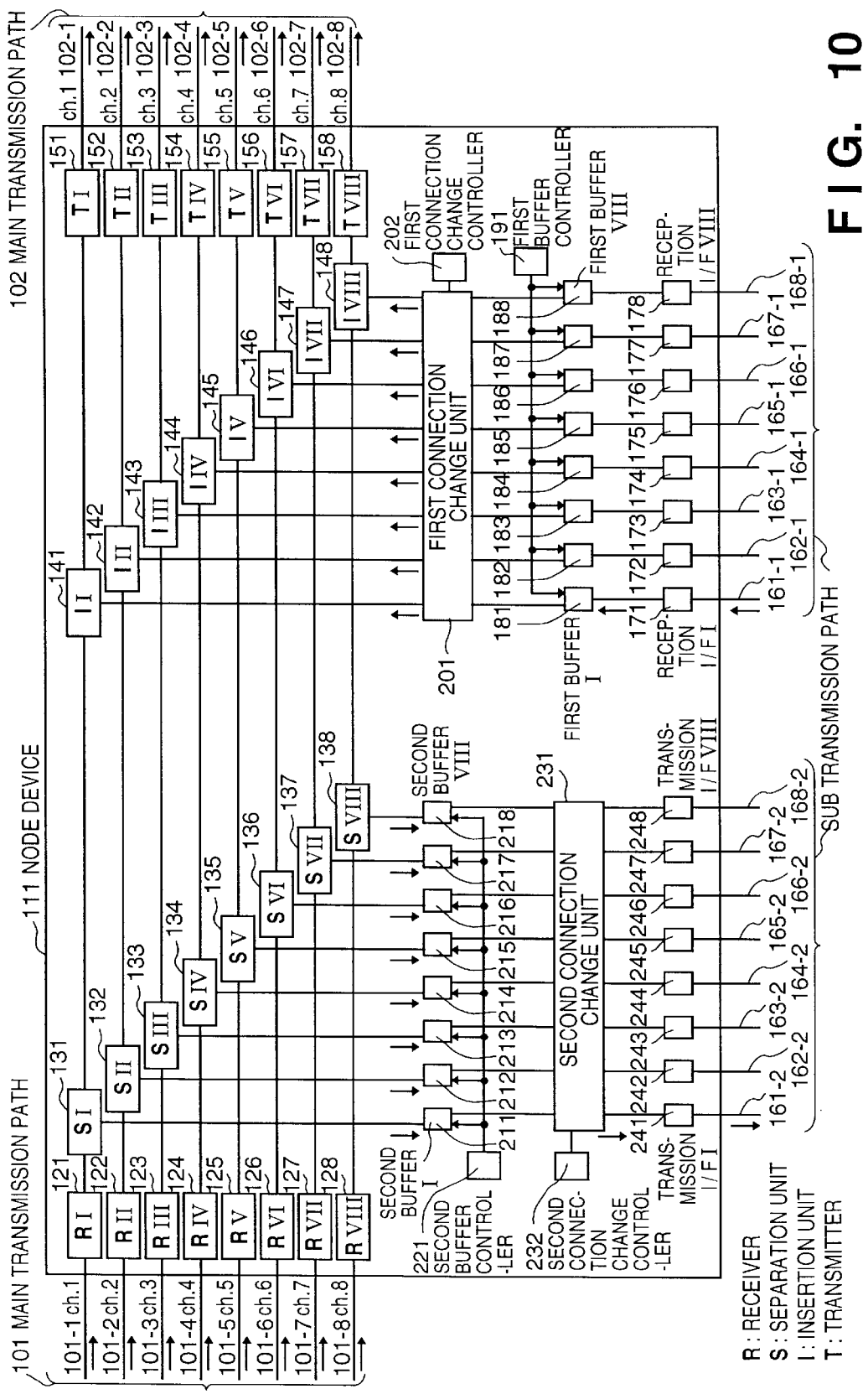
FIG. 10 is a block diagram showing the arrangement of a node device according to the fourth embodiment of the present invention.

FIG. 10 shows the arrangement of a node device used in this embodiment. The arrangement in FIG. 10 differs from the arrangement in FIG. 1 in that the separation and insertion units are replaced with each other, and the first connection change unit, second connection change unit, and the like are replaced accordingly. The functions of these units are the same as those in the above embodiments.

The operation of the fourth embodiment of the present invention will be described below with reference to FIGS. 10, 2, 3, 4, 5A, and 5B.

Packet communications will be exemplified below while taking as an example a case wherein the source terminal device is the terminal device 251 connected to the sub transmission path 161 (161-1 and 161-2) of the node device I 111 (FIG. 2), and the destination is the terminal device 271 connected to the sub transmission path 261 of the node device III 113. In the following description, the same components in different node devices will be denoted by the same reference numerals in FIGS. 10 and 2 to 4 for the sake of simplicity.

The source terminal device 251 connected to the sub transmission path 161 (161-1 and 161-2) of the node device I 111 assembles transmission packets in the format shown in FIG. 3 by adding the node address value of the node device III 113 as the destination, and the sub transmission path address value of the sub transmission path 261 to data to be sent to the terminal device 271 connected to the sub transmission path 261 of the node device III 113, and sends the packets to the reception I/F I 171 of the node device I 111 via the sub transmission path 161-1. The reception I/F I 171 converts the received packets into those suitable for transmission between node devices, and outputs the converted packets to the first buffer I 181.

The first buffer I 181 sequentially writes the input packets in its internal memory. On the other hand, the first connection unit 201, the input terminals I to VIII of which are respectively connected to the first buffers I 181 to VIII 188, and the output terminals I to VIII of which are respectively connected to the insertion units I 141 to VIII 148, changes the connections between the input terminals I to VIII and the output terminals I to VIII, in units of operation periods T1, T2, T3, T4, T5, T6, T7, and T8, in the pattern shown in FIG. 5A under the control of the first connection change controller 202. More specifically, during the operation period T1 in which the input terminal I connected to the first buffer I 181 is connected to the output terminal I, a packet written in the internal memory of the first buffer I 181 is read out under the control of the first buffer controller 191, and is output to the input terminal I of the first connection change unit, thus outputting the packet from the output terminal I thereof. Subsequently, during the operation period T2 in which the input terminal I is connected to the output terminal II, a packet written in the internal memory of the first buffer I 181 is read out under the control of the first buffer controller 191, and is input to the input terminal I of the first connection change unit, thus outputting the packet from the output terminal II thereof. The same operations similarly repeat during the operation periods T3 to T8. Upon completion of the period T8, the operations during the operation periods T1 to T8 repeat. With these operations, the packets output from the terminal device 251 and sent via the sub transmission path 161-1 are sequentially distributed to the output terminals I to VIII of the first connection change unit, and are output to the insertion units I 141 to VIII 148 to which the output terminals I to VIII are respectively connected. The insertion units I 141 to VIII 148 find empty packets without any node device identification information from the packet flows respectively output from the separation units I 131 to VIII 138 connected thereto, insert the packets output from the output terminals I to VIII of the first connection change unit 201 into these packets, and output these packets to the transmitters I 151 to VIII 158. The transmitters I 151 to VIII 158 convert the input packet signals into optical signals using semiconductor lasers (or light-emitting diodes), and output these optical signals onto the optical fibers 102-1 to 102-8 connected thereto.

The packet signals output from the terminal device 251 are equally distributed onto the eight channels that make up the main transmission path, and are input to the neighboring node device II 112. Since the node address value of the node device III 113 is described as the node device identification information in each packet, the node device II 112 relays these packets. More specifically, the packets converted into the optical signals and sent via the individual channels are converted into electrical signals by the receivers I 121 to VIII 128 of the corresponding channels, and the electrical signals are input to the corresponding separation units I 131 to VIII 138. In these separation units I 131 to VIII 138, since these packets do not describe the corresponding node address value, they are output to the insertion units I 141 to VIII 148 without being separated. The insertion units I 141 to VIII 148 execute the above-mentioned packet insertion if there are packets to be inserted output from the terminal devices, and directly input the packets from the terminal device 251 to the transmitters I 151 to VIII 158. The transmitters I 151 to VIII 158 convert these packets into optical signals again, and input the optical signals to the neighboring node device III 113 via the main transmission path 103.

The operation in the node device III 113 as the destination will be explained below. The packet signals, which are output from the terminal device 251 and are input to the node device III 113 while being distributed onto the eight channels that make up the main transmission path 103, are received by the receivers I 121 to VIII 128, and are respectively input to the separation units I 131 to VIII 138. The separation units I 131 to VIII 138 discriminate and separate packets that describe the node address value of the node device III 113 from the input packet flows, and output the separated packets to the second buffers I 211 to VIII 218. At this time, the separation units I 131 to VIII 138 insert empty packets at the positions of the separated packets, and output them to the transmitters.

The second buffers I 211 to VIII 218 sequentially write the input packets in the storage areas corresponding to the sub transmission path to which the destination terminal of the packets is connected. More specifically, in this case, the packets are sequentially written in the storage areas I corresponding to the sub transmission path 261 to which the destination terminal device 271 is connected. On the other hand, the second connection change unit 231, the input terminals I to VIII of which are connected to the second buffers I 211 to VIII 218, and the output terminals I to VIII of which are connected to the transmission I/Fs I 241 to VIII 248, changes the connections between the input terminals I to VIII and the output terminals I to VIII, in units of operation periods T1', T2', T3', T4', T5', T6', T7', and T8', in the pattern shown in FIG. 5B under the control of the second connection change controller 232. Assuming that the sub transmission path 261 to which the destination terminal device 271 is connected corresponds to the sub transmission path 161-2 in FIG. 10, since this sub transmission path is connected to the transmission I/F I 241, the following operations are done to output to this I/F the packets which have been sent while being distributed onto different channels. More specifically, during the operation period T1' in which the input terminal I connected to the second buffer I 211 is connected to the output terminal I, a packet written in the storage area I 111 in the second buffer I 211 is read out under the control of the second buffer controller 221. If the sub transmission path address value of that packet is concordant with the sub transmission path 261 (corresponding to 161) to which the terminal device 271 is connected, the packet is output to the input terminal I of the second connection change unit, thus outputting that packet from the output terminal I thereof. Subsequently, during the operation period T2' in which the input terminal II is connected to the output terminal I, a packet written in the storage area I of the second buffer II 212 is read out under the control of the second buffer controller. If the sub transmission path address value of that packet is concordant with the sub transmission path 261 (corresponding to 161) to which the terminal device 271 is connected, the packet is output to the input terminal II of the second connection change unit, thus outputting the packet from the output terminal I thereof. The same operations similarly repeat during the operation periods T3' to T8'. Upon completion of the period T8', the operations during the operation periods T1' to T8' repeat. With these operations, the packets, which are output from the terminal device 251, are sent while being distributed onto the eight channels that make up the main transmission path, and are written in the storage areas I in the second buffers I 211 to VIII 218, are collected to the sub transmission path to which the destination terminal device is connected by the connection function of the second connection change unit, and are sent to the destination terminal device.

When a node device having an arrangement in which the separation units are arranged at the input side of the insertion units is used like this embodiment, signals to be sent to a terminal connected to an identical node device are transmitted via all other node devices on a loop since they are transmitted one way on the loop in this embodiment and the like. However, in the arrangement of this embodiment, since the signals to be separated by the separation units of those input to the node devices are separated before the insertion units, empty packets in which the insertion units can insert signals can be easily assured. More specifically, when one node device has both the separation and insertion units, and terminals and the like connected to the node device can perform both transmission and reception of signals, whether the insertion or separation units are arranged at the input side of the other can be determined depending on the use pattern of the network. For example, when communications between terminals and the like connected to an identical node device are more frequent, the insertion units are preferably disposed at the input side of the separation units. If the insertion and separation functions are respectively prepared as units, the layout can be easily changed in correspondence with a change in use pattern.

Even when a node device that has an arrangement in which the separation units are arranged at the input side of the insertion units like this embodiment is used, both the arrangement that uses channel multiplex such as wavelength multiplex between node devices as in the second embodiment, and the arrangement in which the number of channels in the main transmission paths is different from that of the sub transmission path as in the third embodiment may be used.

The embodiments of the present invention have been described. As can be seen from the above description, one characteristic feature of the present invention lies in distribution of signals from one sub transmission path onto a plurality of channels. Especially, in the embodiments described above, the distributed signals are inserted into empty packets found from channels to be inserted in the insertion units. More specifically, in the present invention, by arranging the insertion units, signals from the sub transmission path can be distributed onto the respective channels without being influenced by signals on the channels onto which the signals are to be output. For example, the distribution according to the present invention can be implemented even when there are only two node devices, and each node device does not have an arrangement in which all the signals output from the first node device are received by the second node device, and do not influence signals output from the second node device toward the first node device, but receives both signals which are input from another node device and are to be relayed to still another node device, and signals from sub transmission paths.

The present invention also has its characteristic feature in the reception. In the present invention, the separation units separate the signals to be output to the corresponding ones of the sub transmission paths to which the separation units are connected via the connection change unit. Since the present invention has these separation units, only desired signals can be separated from the channels that transfer signals with various addresses, and the separated signals can be output to desired sub transmission paths connected via the connection change unit.

Furthermore, according to the present invention, a node device for transmitting signals comprises separation units which correspond to a plurality of channels onto which the signals are distributed, since signals are distributed and output onto the plurality of channels. These separation units can be connected to an identical sub transmission path via the connection change unit, so that signals distributed onto the plurality of channels can be output to a single sub transmission path. At this time, when signals from more than one separation units are simultaneously input to a single sub transmission path, signal collisions occur. In the embodiments described above, signals separated by a plurality of separation units are temporarily stored in the buffers, one sub transmission path is connected to the respective buffers in a predetermined pattern, and each buffer is controlled to read out a signal to be output onto the connected sub transmission path, thus avoiding signal collisions. With this arrangement, the need for arbitration control of signals output from the respective buffers can be obviated, and the control load can be greatly reduced. In the embodiments described above, a plurality of sub transmission paths are connected to the connection change unit. The arrangement in the above embodiments amounts to an architecture in which a buffer for temporarily storing a signal separated by a single separation unit is connected to a plurality of sub transmission paths in a predetermined pattern. Interpreted this way, since the sub transmission paths to which the buffer is connected need not be switched in accordance with the address of the signal output from the buffer, the control load is light. Upon connecting a plurality of buffers to a plurality of sub transmission paths, when these buffers are connected to a single sub transmission path in the order according to a predetermined pattern, while one buffer is connected to one sub transmission path, other buffers are connected to other sub transmission paths, thus realizing efficient connections. Hence, the above embodiments use such arrangement.

In the above embodiments, some examples of the number of channels of the main transmission path and the number of sub transmission paths, i.e., an example wherein the number of channels of the main transmission path is eight and the number of sub transmission paths is also eight, an example wherein the number of channels of the main transmission path is eight and the number of sub transmission paths is four, and the like have been presented. However, these numbers can be appropriately selected.

Fifth Embodiment

Multicast communications and broadcast communications in a network according to an embodiment of the present invention will be explained hereinafter.

When multicast and broadcast communications are to be made in the network to which the node devices of each of the first to fourth embodiments are connected, a transmitting terminal must transmit packets in correspondence with the number of destination terminals.

More specifically, assuming that a certain terminal device transmits a packet to three terminal devices, the transmitting terminal must assemble three packets in which the addresses of these destination terminals are inserted, and must transmit these three packets.

Hence, as the number of destination terminals of multicast communications becomes larger, the number of packets to be sent increases, thus increasing the traffic on the network.

Especially, in case of broadcast communications, packets must be sent in correspondence with the number of all the terminal devices connected to the network.

Even when the number of packets to be sent on the network increases, communications may be possible. However, the traffic on the network had better be small.

In view of this problem, in this embodiment, a network that can prevent the traffic on the network from increasing even when multicast or broadcast communications are to be made, and can effectively and efficiently use the transmission band will be explained.

Figure 13:
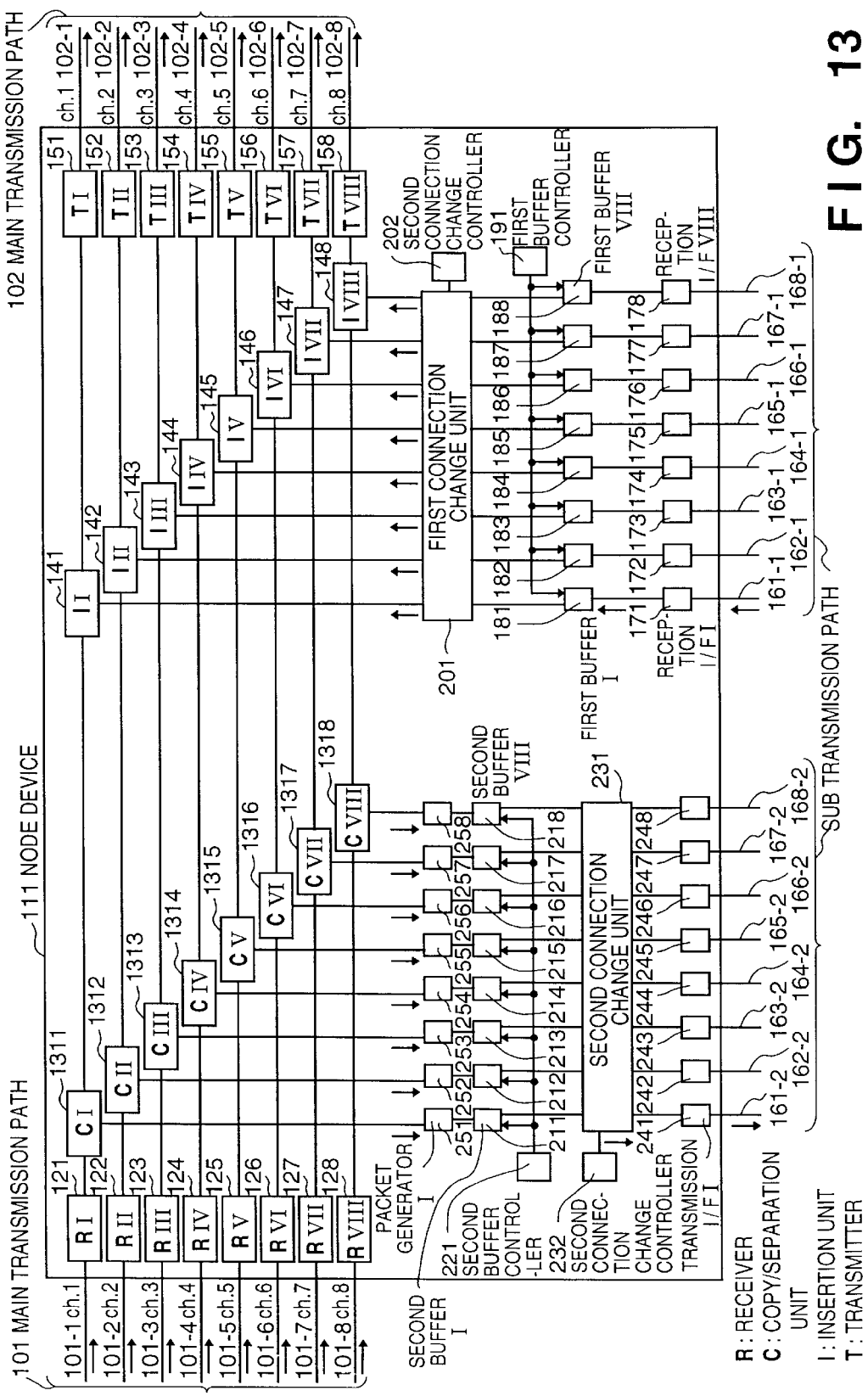
FIG. 13 is a block diagram showing the arrangement of a node device according to the fifth embodiment of the present invention.

FIG. 13 shows the arrangement of a node device according to this embodiment, i.e., an example of a node device which connects eight sub transmission paths to a main transmission path in a network system using the main transmission path having eight channels. Note that a description of portions having the same functions as those in FIG. 10 will be omitted.

Figure 14:
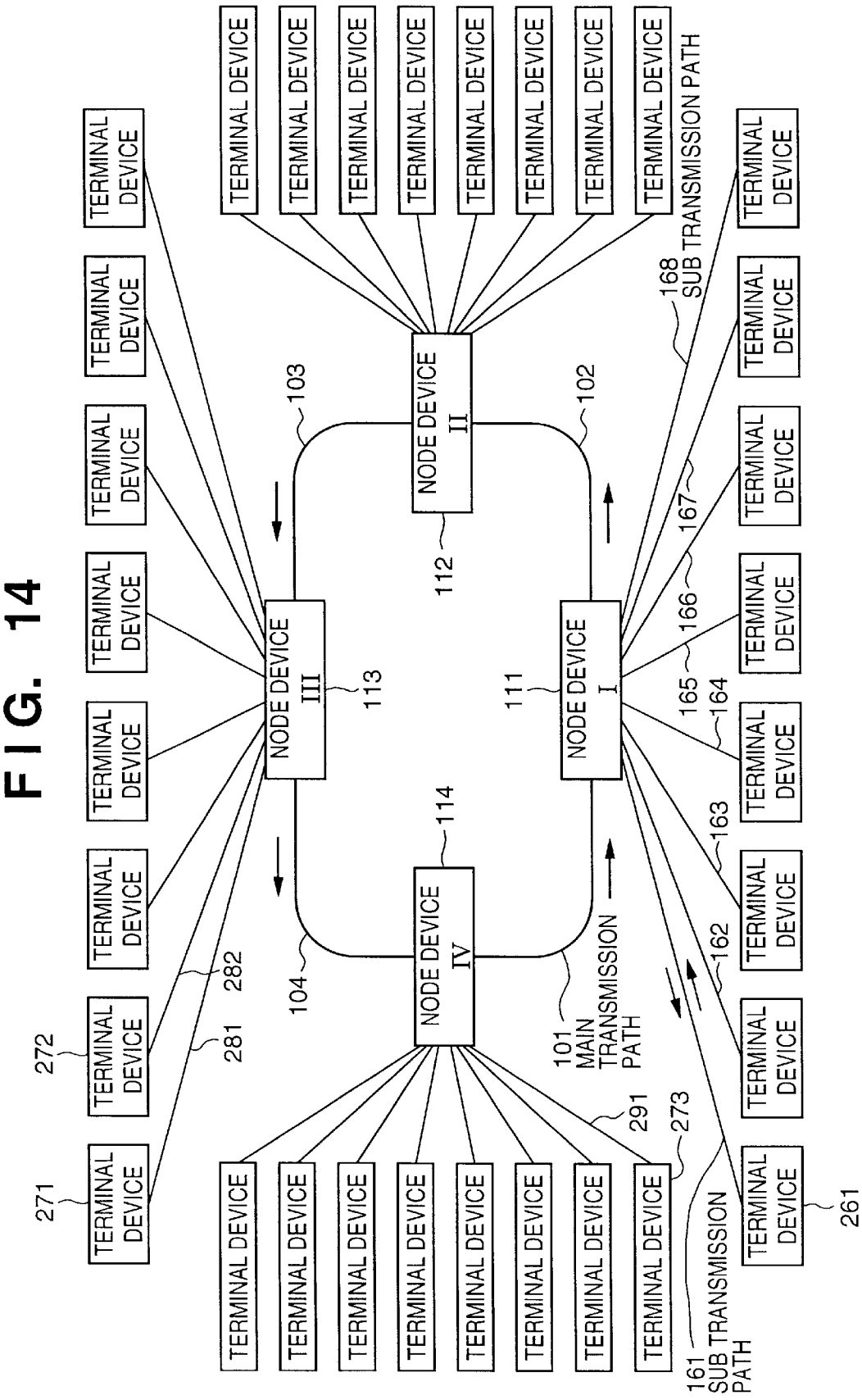
FIG. 14 is a diagram showing the arrangement of a network according to the fifth embodiment of the present invention.

FIG. 14 shows an example of the arrangement of the network system using the node device according to this embodiment shown in FIG. 13, i.e., an example using four node devices, which are connected in a loop pattern via multi-channel main transmission paths. Each arrow indicates the transmission direction of a packet. The four node devices have the same internal arrangements, as shown in FIG. 13.

In FIG. 13, reference numerals 1311 to 1318 denote copy/separation units I to VIII serving as copy/separation means. Each copy/separation unit has a function of separating a packet to be sent to a terminal device or the like connected thereto via a sub transmission path from a packet flow output from the corresponding receiver, and a function of forming two copies of a multicast packet (to be described later) of the separated packets, outputting one copied packet to a packet generator (to be described later), and outputting the other copied packet to the insertion unit after the address of the own node device and sub transmission path address corresponding to that address are stripped off from the packet. Reference numerals 251 to 258 denote packet generators serving as packet generation means. Each packet generator generates a predetermined number of copies of the packet output from a corresponding one of the copy/separation units I to VIII, and outputs them to a corresponding one of the second buffers I to VIII. When the packet generators I to VIII receive non-copied packets, they transfer these packets to the second buffers I to VIII.

Figure 15:
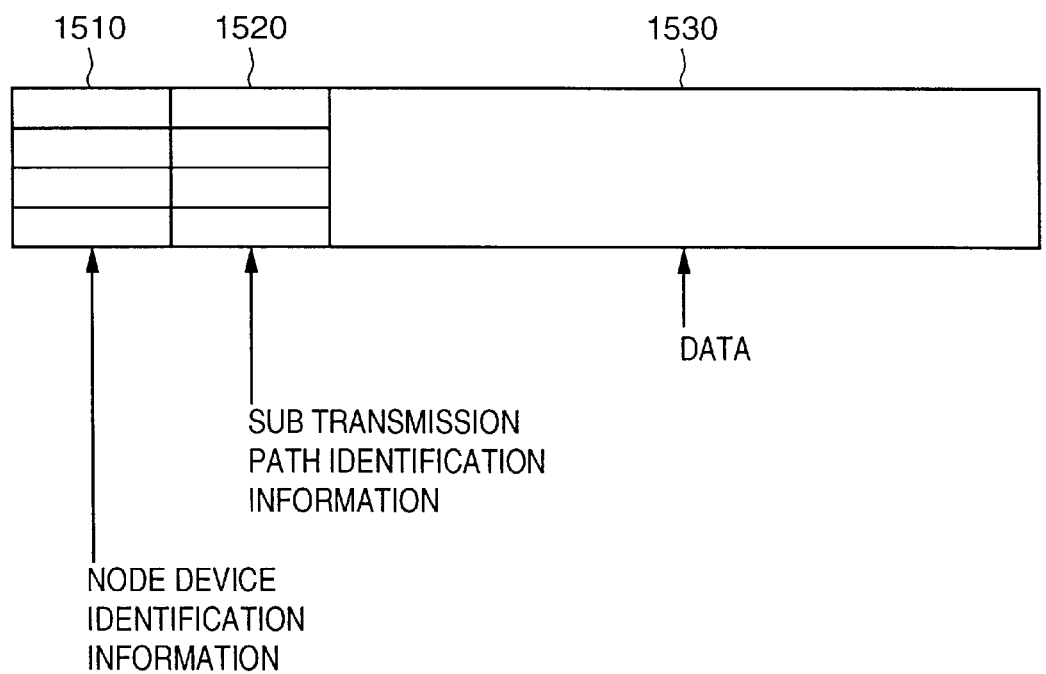
FIG. 15 shows the packet format in the fifth embodiment of the present invention.

FIG. 15 shows an example of the packet format in this embodiment. Reference numeral 1510 denotes a field for describing node device identification information. More specifically, this field 1510 describes a node address used for identifying a node device to which the sub transmission path connected with the destination terminal device of a packet is connected. Reference numeral 1520 denotes a field for describing sub transmission path identification information of a packet. More specifically, the field 1520 describes a sub transmission address for identifying the sub transmission path to which the destination terminal device of a packet is connected. Reference numeral 1530 denotes a data field in which data to be transmitted by this packet is inserted. In 1-to-n communications (: multicast or broadcast communications), the addresses of all the node devices to which destination terminals are connected, and the addresses of the sub transmission paths to which the terminals are connected are written in fields 1510 and 1520 of a packet. A packet written with a plurality of addresses will be called a multicast packet hereinafter.

The operation of this embodiment will be described below with reference to FIGS. 13, 14, 15, 4, 5A, and 5B.

This embodiment will exemplify packet transmission in multicast communications in which the source terminal device is a terminal device 261 connected to a sub transmission path 161 (161-1 and 161-2) of a node device I (111; FIG. 14), and destinations are terminal devices 271, 272, and 273.

In the following description, the same components in different node devices will be denoted by the same reference numerals in FIGS. 13 and 11.

The source terminal device 261 assembles transmission packets in the format shown in FIG. 15 by adding to a header of each transmission packet the address value of a node device III 113 and the sub transmission address value of a sub transmission path 281, the address value of the node device III 113 and the sub transmission address value of a sub transmission path 282, and the address value of a node device IV 114 and the sub transmission address value of a sub transmission path 291, and outputs these packets to onto the sub transmission path 161-1. The output packets are sent to the reception I/F 171 of the node device I 111 via the sub transmission path 161-1. The reception I/F 171 converts the received packets into those suitable for transmission between nodes, and outputs the converted packets to the first buffer I 181.

The first buffer I sequentially writes the input packets in its internal memory. In accordance with the connections between the input and output terminals of the first connection change unit shown in FIG. 5A, the packets stored in the first buffer I are output to the output terminal I during the operation period T1 and to the output terminal II during the operation period T2, and the same operations repeat during the operation periods T3 to T8. Upon completion of the period T8, the operations during the operation periods T1 to T8 repeat. With these operations, the packets output from the terminal device 261 and sent via the sub transmission path 161-1 are sequentially distributed to the output terminals I to VIII of the first connection change unit, and are output to the insertion units I to VIII to which the output terminals I to VIII are respectively connected. In the description of this embodiment, of multicast packets output from the terminal device 261, one packet output to the insertion unit V 145 will be referred to as a packet A hereinafter. Since packets output to the insertion units other than the insertion unit V 145 are sent in the same manner as the packet A, a detailed description thereof will be omitted. Upon reception of the packet A, the insertion unit V 145 finds an empty packet that describes no node device identification information from the packet from output from the copy/separation unit V 1315, inserts the packet A into that empty packet, and outputs the packet to the transmitter. The transmitter V 155 converts the input packet A into an optical signal using a semiconductor laser (or light-emitting diode), and outputs the optical signal onto an optical fiber 102-5.

Since the packet A input to the node device II 112 is addressed to the node devices III 113 and IV 114, the node device II 112 relays it. More specifically, the packet A converted into an optical signal and sent via the channel 102-5 is converted into an electrical signal by the receiver V 125. Since the packet A does not describe any corresponding node address value, the copy/separation unit V 1315 outputs it to the insertion unit V 145 without separating it. The packet A input to the insertion unit V 145 is directly input to the transmitter V 155. The transmitter V 155 converts the packet A into an optical signal again, and inputs the optical signal to the neighboring node device III 113 via a main transmission path 103.

Communications in the node device III 113 as one destination will be explained below. Each of a plurality of packets output from the transmitting terminal is sent via one of the eight channels that make up the main transmission path, is received by one of the receivers of the node device, and is then input to the corresponding copy/separation unit. Each copy/separation unit separates a packet that describes the node address value of the own node device from the input packet flow. When the separated packet is a packet added with the node addresses of a plurality of node devices, i.e., a multicast packet, the copy/separation unit forms two copies of that packet, outputs one copied packet to the packet generator, and outputs the other copied packet to the insertion unit after the address of the own node device in a field 1510 and the sub transmission path address corresponding to that address are stripped off from the packet. When the separated packet is a packet with only one node address, that packet is directly output to the packet generator. In this case, since the packet A is added with node address values other than the node address value of the node device III 113, the copy/separation unit V 1315 forms two copies of the packet A, outputs one copied packet A to the packet generator V 255, and outputs the other copied packet A to the insertion unit after the address of the own node device (node device III 113) in a field 1510 and the sub transmission path address corresponding to that address are stripped off from the packet.

Upon reception of the copied packet A, the packet generator V 255 generates packets in correspondence with the number of node addresses of the own node device of a plurality of node addresses. At this time, the node address field of each packet generated is added with the node address of the own node device, and the sub transmission path address field is added with the sub transmission path address corresponding to the node address of the own node device of the copied packet A. Therefore, the packet generator V 255 generates two packets B and C on the basis of the copied packet A, and outputs them to the second buffer 215 while adding the address of the sub transmission path 281 to the sub transmission path address field of one generated packet B, and the address of the sub transmission path 282 to the sub transmission path address field of the other generated packet C. The generated packet B with the address of the sub transmission path 281 is stored in the storage area I corresponding to the sub transmission path 281 in the second buffer V 215. The generated packet C with the address of the sub transmission path 282 is stored in the storage area II corresponding to the sub transmission path 282 in the second buffer V 215. Assuming that the sub transmission paths 281 and 282 to which the destination terminal devices 271 and 272 are connected correspond to the sub transmission paths 161-2 and 162-2 in FIG. 13, these sub transmission paths are connected to the transmission I/Fs I 241 and II 242. Hence, in order to output the packet B to the predetermined sub transmission path 281, the packet B is read out from the storage area I of the second buffer V during the operation period T5', in which the input terminal V connected to the second buffer V 215 is connected to the output terminal I, under the control of the buffer controller 221, and the readout packet is output to the output terminal I. The packet B that has passed through the output terminal I is sent via the sub transmission path 281, and arrives the destination terminal device 271. On the other hand, the packet C is read out from the storage area II of the second buffer V during the operation period T4' in which the input terminal V is connected to the output terminal II, and the readout packet is output from the output terminal II onto the sub transmission path 282. The output packet C arrives the destination terminal device 272 via the sub transmission path 282.

Meanwhile, the copied packet A output to the insertion unit V 145 in the node device III 113 passes through the insertion unit V 145, and is converted into an optical signal by the transmitter V 155. The optical signal is input to the neighboring node device IV 114 via the main transmission path 104. The packet A input to the node device IV 114 is received by the receiver V 125, and is output to the copy/separation unit V 1315. The copy/separation unit V 1315 separates the copied packet A from the input packet flow, and outputs the separated packet to the packet generator V 255. Note that the copy/separation unit V 1315 in the node device IV 114 does not form any copies of the copied packet A. This is because the fields 1510 of the packet A input to the node device IV 114 store the addresses of only the node device IV 114, and the copied packet A need not be relayed to another node device. When the copied packet A is input to the packet generator V 255, the generator V 255 generates packets in correspondence with the number of matches between the node address of the own node device IV 114 and those in the fields 1510 that contain the node device identification information. Hence, in this case, one packet D is generated based on the copied packet A. The packet D is output to the second buffer V 215 with the node address of the own node device IV 114 in its node address field, and the address of the sub transmission path 291 in its sub transmission path address field. The packet D output to the second buffer V 215 is stored in the storage area I corresponding to the sub transmission path 291 in the second buffer V 215. The packet D stored in the storage area I in the second buffer V 215 is read out when the input terminal V connected to the second buffer V 215 is connected to the sub transmission path I, i.e., during the operation period T5', and arrives the receiving terminal 273 via the sub transmission path I.

As described above, a multicast packet output from a certain terminal is sent via one of the eight channels of the main transmission path, and a required number of packets are generated by the packet generator connected to that transmission channel in the node device connected with receiving terminals as destinations. After that, the generated packets are output to the corresponding receiving terminals. As compared to a case wherein packets written with the identical information are individually sent from a transmitting terminal to receiving terminals, the traffic on the main transmission path in multicast communications can be reduced, thus allowing transmission of more information.

Sixth Embodiment

The sixth embodiment of the present invention will be described below with reference to FIGS. 3, 14, 11, 5A, 5B, 16, 17, and 18. Note that the differences between the sixth and fifth embodiments are as follows. In the fifth embodiment, a transmitting terminal which is to start multicast communications writes the addresses of node devices to which all the destination terminals are connected, and the addresses of the sub transmission paths to which the destination terminals are connected in the header of a multicast packet, and each node device interprets the header of the multicast packet to output the packets to the predetermined terminals. By contrast, in the sixth embodiment, an identification number for identifying a packet to be output in the multicast communications from those in other multicast communications is determined using a control packet sent prior to the beginning of the multicast communications, and informs node devices connected with destination terminals of connection terminals to which the packets are to be output upon receiving the packet with the identification number. Upon receiving the packet with the identification number, which indicates a multicast packet transmitted to terminals connected to its own node device, each node device outputs the multicast packet to predetermined terminals.

Figure 16:
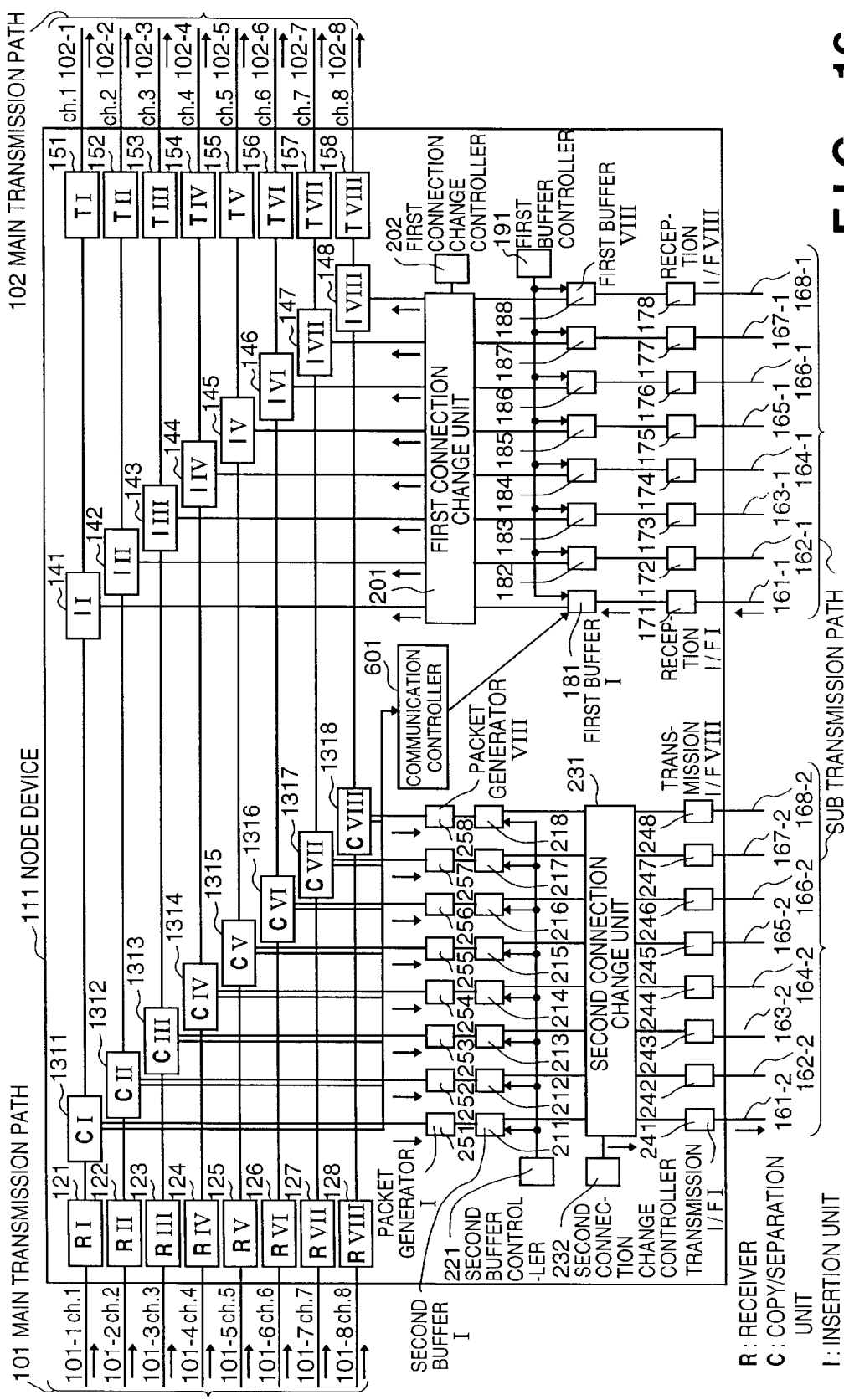
FIG. 16 is a block diagram showing the arrangement of a node device according to the sixth embodiment of the present invention.

FIG. 16 shows a node device according to the sixth embodiment of the present invention. In this node device, a communication controller 601 (to be described later) is added, and the copy/separation units and packet generators have functions different from those in the fifth embodiment. In FIG. 16, reference numeral 601 denotes a communication controller for controlling the respective units in the node device. The communication controller 601 has a function of controlling the operations of copy/separation units (to be described later) and packet generators on the basis of information of a packet output from the copy/separation unit, and outputting packets to other terminals and node devices. Each of the packet generators 251 to 258 has a function of generating packets in correspondence with the number designated by the communication controller 601 upon receiving a packet written with the multicast communication identification number designated by the communication controller 601 in the field 320 (FIG. 3), and writing the sub transmission path address designated by the communication controller 601 in a field 320 of each generated packet. A multicast packet identifier and multicast communication identification number will be explained later in the paragraphs of the transmission control of a multicast packet.

Figure 17:
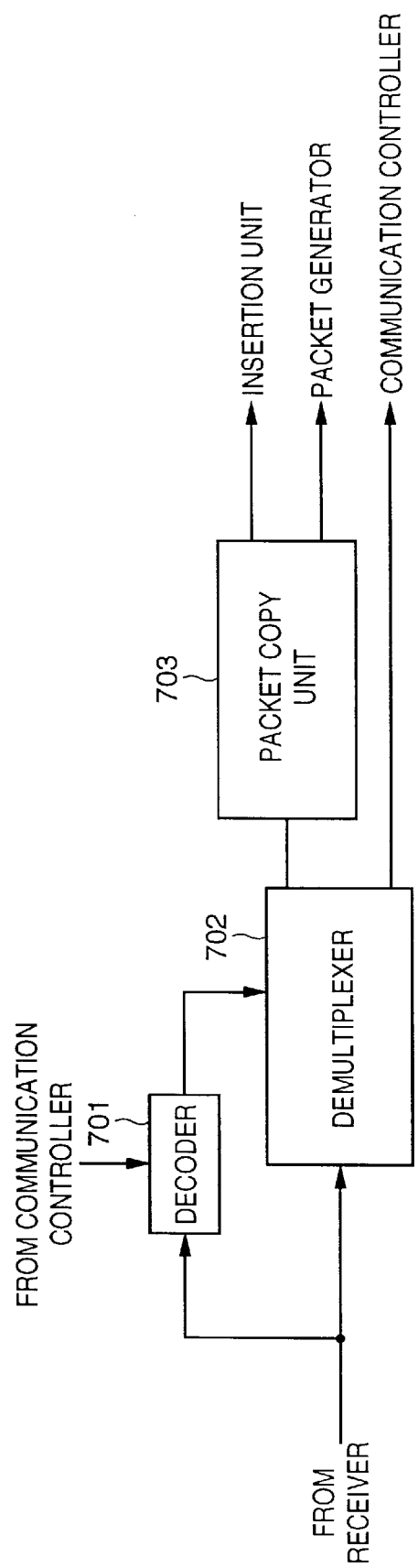
FIG. 17 is a block diagram showing the arrangement of a copy/separation unit according to the sixth embodiment of the present invention.
Figure 18:
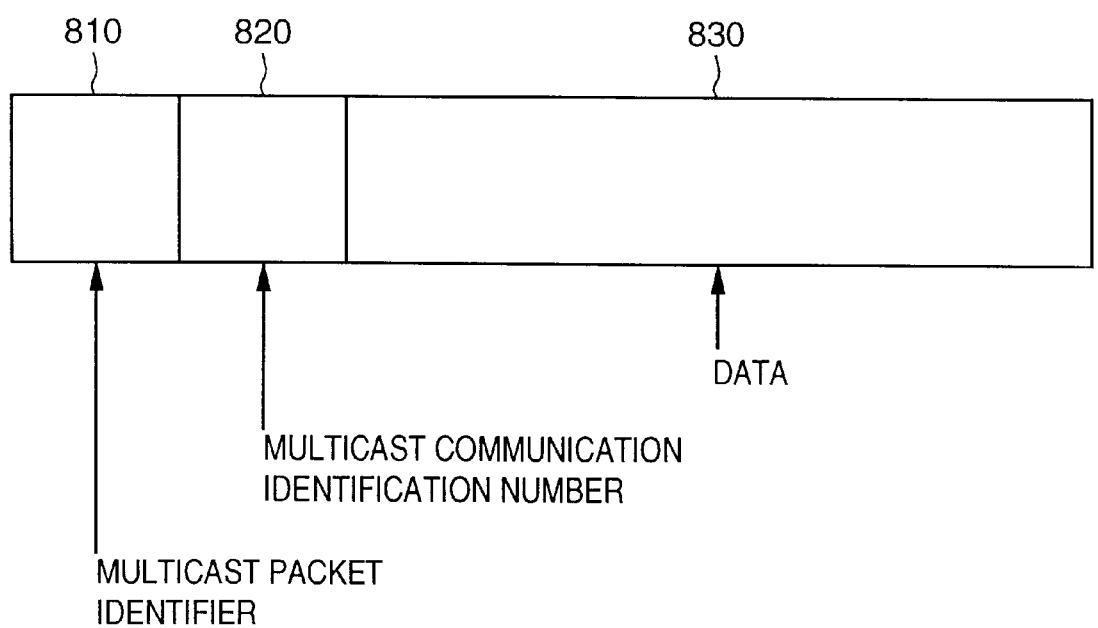
FIG. 18 shows the packet format in the sixth embodiment of the present invention.

FIG. 17 shows the arrangement of the copy/separation unit having a function different from that in the fifth embodiment. The copy/separation unit separates packets written with the node address of the own node device in their fields 310 from the packet flow output from the corresponding receiver, outputs a packet written with the sub transmission path address of the own node device in its field 320 of the separated packets to the corresponding packet generator, and outputs a packet written with the address of the communication controller 601 to the communication controller 601. Also, upon receiving a packet written with a multicast packet identifier and multicast communication identification number designated by the communication controller 601 in its fields 310 and 320, the copy/separation unit forms two copies of that packet, outputs one packet to the packet generator, and outputs the other packet to the insertion unit.

The operation of the sixth embodiment will be described below.

Note that the combination of the transmission and receiving terminals in multicast communications to be exemplified below is the same as that in the fifth embodiment, i.e., the source terminal device is the terminal device 261 in FIG. 14, and the destinations are the terminal devices 271, 272, and 273 therein. In the following description, the same components in different node devices will be denoted by the same reference numerals in FIGS. 3, 14, 11, 16, 17, and 18 for the sake of simplicity.

A control sequence for assigning an identification number to distinguish multicast communications from the terminal device 261 to the terminal devices 271, 272, and 273 from other multicast communications will be explained below. The source terminal device 261 writes the node address of the node device III 113 to which the receiving terminal 271 as one destination is connected, and the address of the communication controller in fields 310 and 320 as the header of a transmission packet A, and also writes the node addresses and sub transmission path addresses of all the receiving terminals for multicast communications, and the node address and sub transmission path address of the own terminal in fields 330 of the transmission packet A. Then, the terminal 271 outputs that packet onto the sub transmission path 161-1. The output packet A is output from the node device I 111 in the same manner as in the fifth embodiment. In the description of this embodiment, assume that the packet A is output onto the channel 102-3 in the main transmission path. The packet A sent via the channel 102-3 is received by the receiver III 123 of the node device III 113 via the node device II 122, and is then output to the copy/separation unit III 1313. The copy/separation unit III 1313 reads out the contents of the field 320 in the header of the packet A, and outputs the packet A to the communication controller 601 as one destination. The communication controller 601 reads out information in the fields 330 of the packet A, and recognizes that multicast communications are to be made from the terminal device 261 to the terminal devices 271, 272, and 273. The communication controller 601 of the node device III 113 checks if multicast communications to the terminal devices 271, 272, and 273 connected to the own node device are possible. If the controller 601 determines that the communications are possible, it determines an identification number (assumed to be "3" in this case) to distinguish the multicast communication in question from those made among other terminals. The communication controller 601 in the node device III 113 writes the address values of the node device IV 114 and communication controller in fields 310 and 320 as the header of a transmission packet B, and also writes in the field 330 of the transmission packet B the node address and sub transmission path address of the receiving terminal 273, the node address and sub transmission path address of the transmitting terminal 261, and the identification number "3" that can distinguish the multicast communications in question from other multicast communications. The controller 601 then outputs the packet B to the first buffer I 181. The packet B output to the first buffer I 181 is output to one insertion unit while its route is switched by the first connection change unit like normal packets. Assume that the packet B is output to the insertion unit IV 114 of the node device III 113. The packet B passes through the insertion unit IV 114, and is converted into an optical signal by the transmitter IV 154. The optical signal is then received by the receiver IV 124 of the neighboring node device IV 114, and arrives the copy/separation unit IV 1314. The copy/separation unit IV 1314 outputs the packet B to the communication controller 601 on the basis of the address values of the node device IV 114 and communication controller 601 written in the header of the packet B. The communication controller 601 checks based on the information written in the field 330 of the packet B if the terminal 273 connected to the own node device can receive a multicast packet. If it is determined that the terminal 273 can receive a multicast packet, the communication controller 601 informs the communication controllers in the respective node devices on the network of the identification number "3" indicating the multicast communications of interest using a control packet C. With such packet, the communication controllers in the respective node devices on the network can recognize the identification numbers of all the multicast communications which are in progress on the network currently. Therefore, a given communication controller that receives the next multicast communication request need only select an identification number other than the already registered multicast communication identification numbers. The control packet has a structure shown in FIG. 18. A special identifier indicating the control packet is written in a field 810. Hence, the copy/separation unit in each node device identifies the control packet from the packet flow output from the corresponding receiver, and outputs that control packet to the communication controller, which reads the information of the control packet. The control packet is transferred as follows. The control packet output from the communication controller is output to the neighboring node device via the first buffer, first connection change unit, insertion unit, and transmitter, and is converted into an electrical signal by the receiver of the neighboring node device. The electrical signal is output to the communication controller in the neighboring node device via the copy/separation unit. The control packet arrives the communication controllers of all the node devices along such route. The communication controllers in the respective node devices recognize the identification numbers of all the multicast communications. The communication controller 601 in the node device IV 114 writes a grant to multicast communications and the multicast communication identification number "3" in information fields 330 of a transmission packet D1, and transmits it to the terminal 261 connected to the node device I 111. Also, the controller 601 writes the contents indicating a reception preparation request for multicast communications from the terminal 261 in information fields 330 of transmission packets D2, D3, and D4, and sends them to the terminals 271, 272, and 273. These control operations assign an identification number different from those assigned to other multicast communications to multicast communications from the terminal 261 to the terminals 271, 272, and 273, and inform the copy/separation units and packet generators in the node devices to which the receiving terminals as destinations are connected of the assigned multicast communication identification number and sub transmission path addresses of the receiving terminals.

The copy/separation unit and multicast packet control in the copy/separation unit will be explained below. The communication controller 601 in the node device to which the destination terminal that is to receive a multicast packet is connected informs the copy/separation units in the own node device of the identification number of the multicast packet. With this control, each copy/separation unit can separate and copy a multicast packet described with the designated identification number. Also, the communication controller 601 informs the packet generators of the number of packets to be generated and the sub transmission path addresses to be written in fields 320 of the generated packets upon reception of a packet added with a given identification number. In this embodiment, the communication controller 601 in the node device III 113 connected with the terminals 271 and 272 that are to receive a multicast packet output from the transmitting terminal 261 informs the copy/separation units to separate a packet added with the multicast communication identification number "3", forms two copies of the separated packet, and outputs one packet to the packet generators and the other to the insertion units. Also, the controller 601 informs the packet generators in the node device III 113 to generate two packets, and to write the addresses corresponding to the sub transmission paths 281 and 283 in fields 320 of the generated packets, and the information in the fields 330 of the copied packet in fields 330 of the generated packets upon reception of a packet added with the multicast communication identification number "3". Furthermore, the communication controller 601 in the node device IV 114 connected with the terminal 273 informs the copy/separation units to separate a packet added with the multicast communication identification number "3", and informs the packet generators to generate one packet, and to write the address of the sub transmission path 291 in a field 320 of the generated packet and the information in the field 330 of the input packet in a field 330 of the generated packet.

Transmission and transfer of a multicast packet will be explained below. The terminal device 261 connected to the node device I (111) assembles a multicast packet E by writing the identifier indicating a multicast packet and the identification number indicating multicast communications from the terminal 261 to the terminals 271, 272, and 273 in fields 310 and 320, and writing information to be sent in a field 330, and outputs that packet E onto the sub transmission path 161-1. The output packet is input to the reception I/F 171 of the node device I 111 via the sub transmission path 161-1. The reception I/F 171 converts the received packet E into one suitable for transfer between node devices, and outputs the converted packet to the first buffer I 181. The packet E stored in the first buffer I 181 is output to any one insertion unit in the own node device by the first connection change unit 201. In this embodiment, assume that the packet E is output to the insertion unit III 143. The packet E output from the insertion unit III 143 to the transmitter III 153 is converted into an optical signal by the transmitter III 153, and the optical signal is output onto the channel 102-3 of the main transmission path. The packet E then reaches the node device II 112. The copy/separation unit III 1313 in the node device II 112 determines based on the identifier indicating the multicast packet written in the field 310 of the packet E that the packet E is a multicast packet, and then checks based on the multicast identification number written in the field 320 if the multicast packet is transmitted to terminals connected to the node device II 112. The copy/separation unit III 1313 determines that the multicast packet E is the output packet in the multicast communications of the identification number "3", i.e., to terminals connected to the node devices III 113 and IV 114, and directly outputs that packet E to the insertion unit III 143. The packet E passes through the insertion unit III 143 and transmitter III 153, and is then received by the receiver III 123 in the node device III 113, which outputs the packet to the copy/separation unit III 1313. The copy/separation unit III 1313 determines based on the identifier indicating the multicast packet written in the field 310 of the packet E that the packet E is a multicast packet. The copy/separation unit III 1313 also recognizes based on the multicast identification number "3" written in the field 320 that the packet E is a multicast packet to be transmitted to the terminals connected to the own node device III 113, separates the packet E from the packet flow from the receiver III 123, and forms two copies of the packet E. One copied packet E is output to the packet generator III 253, and the other copied packet E is output to the insertion unit III 143. The packet generator III 253 recognizes based on the multicast identification number "3" written in the field 320 of the packet E that the packet E is a multicast packet to be transmitted to the terminals 271 and 272 connected to the own node device III 113, and generates two packets F and G. The addresses of the sub transmission paths 281 and 282 are respectively written in fields 320 of the generated packets F and G. The packets F and G are output to the second buffer III 213, and are respectively stored in the storage areas I and II in the second buffer III in accordance with the sub transmission path addresses written in their fields 320. The packet F in the storage area I is read out when the second connection change unit connects the second buffer III and the transmission I/F I 241 connected to the sub transmission path I, and reaches the terminal 271 via the sub transmission path I 281. Also, the packet G in the storage area II is read out when the second connection change unit connects the second buffer III and the transmission I/F II 242 connected to the sub transmission path II, and arrives the terminal 272 via the sub transmission path II 282.

Meanwhile, the copied packet E output from the copy/separation unit III 1313 of the node device III 113 passes through the insertion unit III 143, is converted into an optical signal by the transmitter III 153, and is output onto the channel 102-3 (main transmission path 104 in FIG. 14). The copied packet E is received by the receiver III 123 in the node device IV 114, and is output to the copy/separation unit III 1313. The copy/separation unit III 1313 recognizes based on the identifier and multicast identification number "3" written in the fields 310 and 320 of the packet E that the packet E is a multicast packet to be transmitted to the terminal 273 connected to the own node device IV 114, separates the packet E from the packet flow from the receiver III 123, and outputs the separated packet to the packet generator III 253. In this case, the communication controller 601 in the node device IV 114 inhibits the copy/separation unit III 1313 from copying the packet E and outputting the copied packet to the insertion unit III 143. Subsequently, the packet generator III 253 recognizes based on the multicast identification number "3" written in the field 320 of the packet E that the packet E is a multicast packet to be transmitted to the terminal 273 connected to the own node device IV 114, and generates a packet H. The address of the sub transmission path 291 is written in a field 320 of the generated packet H, and this packet is output to the second buffer III. The output packet H is stored in the storage area I in the second buffer III. The packet H in the storage area I is read out when the second connection change unit connects the second buffer III and the transmission I/F I 241 connected to the sub transmission path I, and reaches the terminal 273 via the sub transmission path I 291.

As described above, in this embodiment, the addresses of all the receiving terminals are not written in the header of one multicast packet unlike the fifth embodiment. Hence, the information volume that can be transmitted per packet can be increased, and efficient multicast communications can be attained. However, in this embodiment, the respective copy/separation units and packet generators must be informed of the identification number of multicast communications and receiving terminals as destinations in the multicast communications indicated by the identification number prior to the multicast communications, so that the respective copy/separation units can identify packets used in a plurality of different multicast communications.

As for communications between the communication controllers and between the communication controller and transmitting terminal, that pertain to identification number assignment control to be done before the beginning of multicast communications, the present invention is not limited to such specific communication sequences, as long as the respective copy/separation units and packet generators can identify packets used in different multicast communications, and can recognize receiving terminals in different multicast communications.

The embodiments of the present invention have been described. As can be seen from the above description, one characteristic feature of the present invention lies in distribution of signals from one sub transmission path onto a plurality of channels. Especially, in the embodiments described above, the distributed signals are inserted into empty packets found from channels to be inserted in the insertion units. More specifically, in the present invention, by arranging the insertion units, signals from the sub transmission path can be distributed onto the respective channels without being influenced by signals on the channels onto which the signals are to be output. For example, the distribution according to the present invention can be implemented even when there are only two node devices, and each node device does not have an arrangement in which all the signals output from the first node device are received by the second node device, and do not influence signals output from the second node device toward the first node device, but receives both signals which are input from another node device and are to be relayed to still another node device, and signals from sub transmission paths.

On the other hand, in the reception, the separation units separate the signals to be output to the corresponding ones of the sub transmission paths to which the separation units are connected via the connection change unit. Since the present invention has these separation units, only desired signals can be separated from the channels that transfer signals with various addresses, and the separated signals can be output to desired sub transmission paths connected via the connection change unit.

Furthermore, a node device for transmitting signals comprises separation units which correspond to a plurality of channels onto which the signals are distributed, since signals are distributed and output onto the plurality of channels. These separation units can be connected to an identical sub transmission path via the connection change unit, so that signals distributed onto the plurality of channels can be output to a single sub transmission path. At this time, when signals from more than one separation units are simultaneously input to a single sub transmission path, signal collisions occur. In the embodiments described above, signals separated by the plurality of separation units are temporarily stored in the buffers, one sub transmission path is connected to the respective buffers in a predetermined pattern, and each buffer is controlled to read out a signal to be output onto the connected sub transmission path, thus avoiding signal collisions. With this arrangement, the need for arbitration control of signals output from the respective buffers can be obviated, and the control load can be greatly reduced. In the embodiments described above, a plurality of sub transmission paths are connected to the connection change unit. The arrangement in the above embodiments amounts to an architecture in which a buffer for temporarily storing a signal separated by a single separation unit is connected to a plurality of sub transmission paths in a predetermined pattern. In such architecture, since the sub transmission paths to which the buffer is connected need not be switched in accordance with the address of the signal output from the buffer, the control load is light. Upon connecting a plurality of buffers to a plurality of sub transmission paths, when these buffers are connected to a single sub transmission path in the order according to a predetermined pattern, while one buffer is connected to one sub transmission path, other buffers are connected to other sub transmission paths, thus realizing efficient connections. Hence, the above embodiments use such arrangement.

In the above embodiments, some examples of the number of channels of the main transmission path and the number of sub transmission paths, i.e., an example wherein the number of channels of the main transmission path is eight and the number of sub transmission paths is also eight, an example wherein the number of channels of the main transmission path is eight and the number of sub transmission paths is four, and the like have been presented. However, these numbers can be appropriately selected.

As the packet used in the above description, an ATM (Asynchronous Transfer Mode) cell may be used.

In this case, since the cell length is fixed, the processing in the respective units in each node device is facilitated.

Also, the network of the present invention can be easily connected to an ATM network.

As described above, according to the present invention, since signals sent via each sub transmission path are distributed to transfer them using a plurality of channels, and the distributed signals are inserted into empty packets found from the respective channels, signals can be distributed and output onto a plurality of channels even in the arrangement in which some signals must pass through the insertion units that inserted the distributed signals. With this arrangement, the communication capacity of the main transmission path can be efficiently used.

Also, in the present invention, signals sent via a plurality of channels of the main transmission paths are temporarily stored in storage means, which are connected in turn to each sub transmission path, thus obviating the need for a large-scale switch fabric. Since the respective storage means are connected in turn to each sub transmission path according to a predetermined pattern, the hardware scale and control load can be reduced. Especially, when there are a plurality of sub transmission paths, the respective storage means are controlled to be simultaneously connected to different sub transmission path, thus efficiently outputting signals from the storage means onto the sub transmission paths. Since each separation unit separates a signal to be output onto the sub transmission path connected to that separation unit from the corresponding channel of the main transmission path to distinguish it from other signals, the present invention can be applied to an arrangement in which signals which are not to be output to the sub transmission path (e.g., signals to be sent to other node devices) are present. In such case, when an address that indicates the separation unit which should separate a packet as a signal to be sent is added to that packet, the separation unit need only check that address indicating the separation unit upon determining whether or not the packet is to be separated. Hence, since the destination of the packet need not be compared with the addresses of all the terminals connected to the network, the control load can be reduced, and high-speed operations can be realized.

Furthermore, multicast and broadcast communications can be easily attained.

Moreover, even in multicast or broadcast communications, an increase in traffic on the network can be prevented as much as possible.

As many apparently widely different embodiments of the present invention can be made without departing from the spirit and scope thereof, it is to be understood that the invention is not limited to the specific embodiments thereof except as defined in the appended claims.

What is claimed is:

1. A node device for connecting a plurality of sub transmission paths, via which signals are sent to terminal devices, to a plurality of channels of a main transmission path for transferring signals between nodes, comprising:

a plurality of insertion means, respectively corresponding to said plurality of channels, for inserting signals sent via said plurality of sub transmission paths into said main transmission path;

a plurality of interface means, respectively corresponding to said plurality of sub transmission paths, for connecting said plurality of sub transmission paths;

changing means for changing connection relations between said plurality of insertion means and said plurality of interface means in accordance with a predetermined order;

separation means, respectively corresponding to the plurality of channels, for separating a signal to be output onto one of said plurality of sub transmission paths from signals sent via said plurality of channels;

a plurality of second interface means, respectively corresponding to said plurality of sub transmission paths, for connecting said plurality of sub transmission paths; and second changing means for changing connection relations between said plurality of separation means and said plurality of second interface means in accordance with a predetermined order.

2. The device according to claim 1, wherein said changing means changes connection relations between said plurality of interface means and said plurality of insertion means in accordance with a predetermined order, with said plurality of insertion means being connected in turn to different interface means.

3. The device according to claim 1, wherein said second changing means changes connection relations between said plurality of second interface means and said plurality of separation means in accordance with a predetermined order, with said plurality of separation means being connected in turn to different second interface mean.

4. The device according to claim 1, wherein each of said plurality of sub transmission paths comprise an output sub transmission path for transmitting a signal to the terminal device, and an input sub transmission path for transmitting a signal output from the terminal device.

5. The device according to claim 1, further comprising:
a plurality of storage means for storing signals separated by said separation means;
copy means for forming a copy of a signal to be stored in one of sold plurality of storage means, and
wherein when a signal stored in one of said plurality of storage means is a signal to be output onto at least two of said plurality of sub transmission paths, said copy means forms a copy of a signal sent from one of said plurality of channels, and stores the copied signal in one of sold plurality of storage means.

6. The device according to claim 1, further comprising:
a plurality of storage means for storing signals separated by said separation means;
copy means for forming a copy of a signal to be stored in one of said plurality of storage means, and
wherein when a signal stored in one of said plurality of storage means is a signal to be output onto at least one of said plurality of sub transmission paths and to be sent to another node device, said copy means forms a copy of a signal sent from one of said plurality of channels, stores the copied signal in one of said plurality of storage means, and outputs the copied signal to at least one of said plurality of channels to output the signal to said other node device.

7. The device according to claim 5, wherein said copy means forms a copy of the signal in accordance with copy instruction information for instruction formation of a copy contained in the signal.

8. The device according to claim 7, wherein the copy instruction information includes destination information indicating a destination of a signal.

9. The device according to claim 8, wherein said copy means forms copies of the signal when the destination information indicates a plurality of destinations.

10. The device according to claim 7, wherein the copy instruction information includes an attribute of a communication that requires formation of a copy of the signal.

11. The device according to claim 10, wherein the communication that requires formation of a copy of the signal includes a multi-cast communication.

12. The device according to claim 10, wherein the communication that requires formation of a copy of the signal includes a broadcast communication.

13. The device according to claim 7, further comprising copy instruction information communication means for communicating the copy instruction information with another node device.

14. A node device for connecting a plurality of sub transmission paths, via which signals are sent to terminal devices, to a plurality of channels of a main transmission path for transferring signals between nodes, comprising:
a plurality of output means, respectively corresponding to said plurality of channels, for outputting signals sent via said main transmission path to said plurality of sub transmission paths;
a plurality of interface means, respectively corresponding to said plurality of sub transmission paths, for connecting said plurality of sub transmission paths;
changing means for changing connection relations between said plurality of output means and said plurality of interface means in accordance with a predetermined order; and
second changing means for changing connection relations between a plurality of separation means and a plurality of second interface means in accordance with a predetermined order.

15. A node device for connecting a plurality of sub transmission paths, via which signals are sent to terminal devices, to a plurality of channels of a main transmission path for transferring signals between nodes, comprising;
a plurality of storage means, respectively corresponding to said plurality of channels, for storing signals sent via said plurality of channels;
changing means for changing connection relations between said plurality of sub transmission paths and said plurality of storage means in accordance with a predetermined order; and
copy means for forming a copy of a signal to be stored in one of said plurality of storage means.

16. The device according to claim 15, wherein when a signal stored in one of said plurality of storage means is a signal to be output onto at least two of said plurality of sub transmission paths, said copy means forms a copy of a signal sent from one of said plurality of channels, and stores the copied signal in one of said plurality of storage means.

17. A node device for connecting a plurality of sub transmission paths, via which signals are sent to terminal devices, to a plurality of channels of a main transmission path for transferring signals between-nodes, comprising:
a plurality of storage means respectively corresponding to said plurality of sub transmission paths, for storing signals sent via said plurality of sub transmission paths;
changing means for changing connection relations between said plurality of channels and said plurality of storage means in accordance with a predetermined order; and
copy means for forming a copy of a signal to be stored in one of said plurality of storage means.

* * * * *

UNITED STATES PATENT AND TRADEMARK OFFICE
CERTIFICATE OF CORRECTION

PATENT NO. : 6,714,550 B1  
APPLICATION NO. : 09/052447  
DATED : March 30, 2004  
INVENTOR(S) : Yamamoto et al.

It is certified that error appears in the above-identified patent and that said Letters Patent is hereby corrected as shown below:

Title Page Item (73) Assignee:, "(JP)" to read --Tokyo (JP)--

Title Page Item (*) Notice:, Insert:

--This patent issued on a continued prosecution application filed under 37 CFR 1.53(d), and is subject to the twenty year patent tern provisions of 35 U.S.C. 154(a)(2).--

Signed and Sealed this

Eighth Day of April, 2008

JON W. DUDAS  
*Director of the United States Patent and Trademark Office*

UNITED STATES PATENT AND TRADEMARK OFFICE
CERTIFICATE OF CORRECTION

PATENT NO.        : 6,714,550 B1
APPLICATION NO. : 09/052447
DATED             : March 30, 2004
INVENTOR(S)       : Yamamoto et al.

Page 1 of 1

It is certified that error appears in the above-identified patent and that said Letters Patent is hereby corrected as shown below:

Title Page Item (73) Assignee:, "(JP)" to read --Tokyo (JP)--

Title Page Item (*) Notice:, Insert:

--This patent issued on a continued prosecution application filed under 37 CFR 1.53(d), and is subject to the twenty year patent term provisions of 35 U.S.C. 154(a)(2).--

This certificate supersedes the Certificate of Correction issued April 8, 2008.

Signed and Sealed this

Twentieth Day of May, 2008

JON W. DUDAS
*Director of the United States Patent and Trademark Office*